United States Patent
Long et al.

(10) Patent No.: US 11,829,373 B2
(45) Date of Patent: Nov. 28, 2023

(54) METHODS, SYSTEMS, AND MEDIA FOR PRESENTING SEARCH RESULTS

(71) Applicant: Google LLC, Mountain View, CA (US)

(72) Inventors: Eileen Margaret Peters Long, San Jose, CA (US); Jonathan Frankle, Los Gatos, CA (US); Will Chambers, Sunnyvale, CA (US); Jia Wu, Cupertino, CA (US); Charles Thomas Curry, San Jose, CA (US); Matthias Heiler, Zurich (CH); Ruben Sipos, Mountain View, CA (US); Christopher Kenneth Haulk, Millbrae, CA (US); Angela Yu-Yun Yeung, Cupertino, CA (US); Ingrid Karin von Glehn, Mountain View, CA (US)

(73) Assignee: Google LLC, Mountain View, CA (US)

( * ) Notice: Subject to any disclaimer, the term of this patent is extended or adjusted under 35 U.S.C. 154(b) by 2052 days.

(21) Appl. No.: 14/628,093

(22) Filed: Feb. 20, 2015

(65) Prior Publication Data

US 2016/0246791 A1 Aug. 25, 2016

(51) Int. Cl.
*G06F 16/2457* (2019.01)
*G06F 16/951* (2019.01)
(Continued)

(52) U.S. Cl.
CPC ...... *G06F 16/24578* (2019.01); *G06F 16/951* (2019.01); *G06F 16/9535* (2019.01); *G06F 16/9538* (2019.01)

(58) Field of Classification Search
CPC .......... G06F 16/24578; G06F 16/9535; G06F 16/951; G06F 16/9538
(Continued)

(56) References Cited

U.S. PATENT DOCUMENTS 5,706,507 A 1/1998 Schloss
5,870,740 A * 2/1999 Rose ............... G06F 16/334
(Continued)

FOREIGN PATENT DOCUMENTS

CN 101021852 8/2007
CN 104067273 9/2014
(Continued)

OTHER PUBLICATIONS

Concise Dictionary of Mathematics, V&S Publishers (2015).*
(Continued)

*Primary Examiner* — Mohsen Almani
(74) *Attorney, Agent, or Firm* — Shumaker & Sieffert, P.A.

(57) ABSTRACT

Methods, systems, and media for presenting search results are provided. In accordance with some embodiments, the method comprises: receiving text corresponding to a search query; determining whether a content rating score associated with the search query is below a predetermined threshold, wherein the score is calculated by: identifying a first plurality of search results retrieved using the search query, wherein each search result is associated with one of a plurality of content ratings classes; and calculating the content rating score that is a proportion of search results associated with at least one of the content ratings classes among the first plurality of search results; in response to determining that the content rating score is below the predetermined threshold, identifying a second plurality of search results to be presented based on the search query; and causing the second plurality of search results to be presented.

24 Claims, 9 Drawing Sheets

(51) Int. Cl.
*G06F 16/9535* (2019.01)
*G06F 16/9538* (2019.01)

(58) Field of Classification Search
USPC .......................................................... 707/707
See application file for complete search history.

(56) References Cited

U.S. PATENT DOCUMENTS

| | | | | |
|---|---|---|---|---|
| 6,295,559 | B1 | 9/2001 | Emens et al. | |
| 7,085,761 | B2 | 8/2006 | Shibata | |
| 7,519,529 | B1* | 4/2009 | Horvitz | G06F 16/35 |
| | | | | 369/30.04 |
| 2002/0078045 | A1* | 6/2002 | Dutta | G06F 17/30675 |
| 2009/0034851 | A1 | 2/2009 | Fan et al. | |
| 2009/0265317 | A1* | 10/2009 | Buehrer | H04L 47/10 |
| | | | | 707/999.102 |
| 2010/0306229 | A1* | 12/2010 | Timm | G06F 16/9566 |
| | | | | 707/767 |
| 2012/0150850 | A1* | 6/2012 | Parthasarathy | G06F 17/30867 |
| | | | | 707/728 |
| 2016/0110460 | A1* | 4/2016 | Johnson | G06F 3/048 |
| | | | | 707/707 |

FOREIGN PATENT DOCUMENTS

| | | |
|---|---|---|
| GB | 2377064 | 12/2002 |
| WO | WO/2013/138743 | 9/2013 |

OTHER PUBLICATIONS

Transcript of ehow, Math Lessons & Study Tips : How Does a Grading Curve Work? (Jan. 23, 2009), https://www.youtube.com/watch?v=02zBh0_CyHM.*

Duarte Torres, Sergio, Ingmar Weber, and Djoerd Hiemstra. "Analysis of search and browsing behavior of young users on the web." ACM Transactions on the Web (TWEB) 8.2 (2014): 1-54. (Year: 2014).*

Duarte Torres, Sergio, Djoerd Hiemstra, and Pavel Serdyukov. "An analysis of queries intended to search information for children." Proceedings of the third symposium on Information interaction in context. 2010. (Year: 2010).*

Aregay, Tesfay. Ranking Factors for Web Search: Case Study in the Netherlands. MS thesis. University of Twente, 2014. (Year: 2014).*

Duarte Torres, Sergio. "Information retrieval for children: search behavior and solutions." (2014). (Year: 2014).*

Duarte Torres, Sergio, and Ingmar Weber. "What and how children search on the web." Proceedings of the 20th ACM international conference on Information and knowledge management. 2011. (Year: 2011).*

Gossen, Tatiana, Thomas Low, and Andreas Nürnberger. "What are the real differences of children's and adults' web search." Proceedings of the 34th international ACM SIGIR conference on Research and development in Information Retrieval. 2011. (Year: 2011).*

Google Webmasters, "How does SafeSearch work?", last udpated Aug. 19, 2011, p. 1, available at http://www.youtube.com/watch?v=H2EIN24r-3M#t=143, last accessed Mar. 29, 2016.

International Search Report dated Dec. 4, 2016 in International Patent Application No. PCT/US2016/012077.

International Preliminary Report on Patentability dated Aug. 22, 2017 in International Patent Application No. PCT/US2016/012077.

Examination Report dated Nov. 16, 2018 in EP Patent Application No. 16702993.3.

Office Action dated Mar. 15, 2021 in CN Patent Application No. 201680011172.6.

* cited by examiner

US 11,829,373 B2

METHODS, SYSTEMS, AND MEDIA FOR PRESENTING SEARCH RESULTS

TECHNICAL FIELD

The disclosed subject matter relates to methods, systems, and media for presenting search results.

BACKGROUND

Vast amounts of content are being published by content providers to content sites for consumption, such as video sharing sites and social media sites. For example, individuals with mobile phones can record events and publish videos to a social media site for anyone to view. Furthermore, more formal publishers, such as for example educational institutions, advertisers, and/or production companies, produce content to be published on the same content sites as an individual. A consumer wanting to explore available content may perform a search on the content site to retrieve a resulting list of content. However, certain content retrieved from the search may be deemed objectionable and/or not suitable for presentation to the consumer. For example, children may search for media content, such as videos, audio recordings, television programs, etc., on various computing devices. Parents may not want their children to be able to view results from search queries that may result in mature content (e.g., violent content, sexual content, profanity, drug use, etc.) being retrieved. Moreover, a single instance of mature content or otherwise objectionable content that is presented to a child can be deemed to have a devastating effect. However, it can be difficult to identify search queries that may result in mature content.

Accordingly, it is desirable to provide new methods, systems, and media for presenting search results.

SUMMARY

Methods, systems, and media for presenting search results are provided.

In accordance with some embodiments of the disclosed subject matter, a method for presenting search results is provided, the method comprising: receiving text corresponding to a search query entered on a user device; determining whether a content rating score associated with the search query is below a predetermined threshold value, wherein the score is calculated by: identifying a first plurality of search results retrieved using the search query, wherein each search result in the first plurality of search results is associated with one of a plurality of content ratings classes; and calculating the content rating score that is a proportion of search results associated with at least one of the content ratings classes among the first plurality of search results; in response to determining that the content rating score is below the predetermined threshold value, identifying a second plurality of search results to be presented based on the search query; and causing the second plurality of search results to be presented on the user device.

In accordance with some embodiments of the disclosed subject matter, a system for presenting search results is provided, the system comprising: a hardware processor that is programmed to: receive text corresponding to a search query entered on a user device; determine whether a content rating score associated with the search query is below a predetermined threshold value, wherein the hardware processor is further programmed to: identify a first plurality of search results retrieved using the search query, wherein each search result in the first plurality of search results is associated with one of a plurality of content ratings classes; and calculate the content rating score that is a proportion of search results associated with at least one of the content ratings classes among the first plurality of search results; in response to determining that the content rating score is below the predetermined threshold value, identify a second plurality of search results to be presented based on the search query; and cause the second plurality of search results to be presented on the user device.

In accordance with some embodiments of the disclosed subject matter, a non-transitory computer-readable medium containing computer executable instructions that, when executed by a processor, cause the processor to perform a method for presenting search results, is provided. The method comprises: receiving text corresponding to a search query entered on a user device; determining whether a content rating score associated with the search query is below a predetermined threshold value, wherein the score is calculated by: identifying a first plurality of search results retrieved using the search query, wherein each search result in the first plurality of search results is associated with one of a plurality of content ratings classes; and calculating the content rating score that is a proportion of search results associated with at least one of the content ratings classes among the first plurality of search results; in response to determining that the content rating score is below the predetermined threshold value, identifying a second plurality of search results to be presented based on the search query; and causing the second plurality of search results to be presented on the user device.

In accordance with some embodiments of the disclosed subject matter, a system for presenting search results is provided, the system comprising: means for receiving text corresponding to a search query entered on a user device; means for determining whether a content rating score associated with the search query is below a predetermined threshold value, wherein the score is calculated by: means for identifying a first plurality of search results retrieved using the search query, wherein each search result in the first plurality of search results is associated with one of a plurality of content ratings classes; and means for calculating the content rating score that is a proportion of search results associated with at least one of the content ratings classes among the first plurality of search results; in response to determining that the content rating score is below the predetermined threshold value, means for identifying a second plurality of search results to be presented based on the search query; and means for causing the second plurality of search results to be presented on the user device.

In some embodiments, the system further comprises means for applying a weight to each of the first plurality of search results, wherein the proportion of search results associated with at least one of the content ratings classes is calculated using the weight.

In some embodiments, the weight is determined based on a relevance of the associated search result to the search query.

In some embodiments, the second plurality of search results is identified based on the content rating class associated with each of the first plurality of search results.

In some embodiments, the second plurality of search results is a subset of the first plurality of search results.

In some embodiments, the plurality of content ratings classes correspond to a first content rating class designated for content that is suitable for all ages and a second content rating class designated for content that is suitable for adults.

In some embodiments, the predetermined threshold value includes a first threshold value and a second threshold value and the system further comprises: in response to determining that the content rating score is above the predetermined threshold value, means for determining a first relevance of search results associated with a first of the plurality of content ratings classes to the search query and a second relevance of search results associated with a second of the plurality of content ratings classes to the search query; means for determining whether the first relevance is similar to or larger than the second relevance; in response to determining that the first relevance is similar to or larger than the second relevance, means for identifying a third plurality of search results to be presented; and means for causing the third plurality of search results to be presented on the user device.

In some embodiments, the system further comprises: in response to determining that the score is above a second predetermined threshold value, means for inhibiting presentation of search results based on the search query; and means for causing an indication that presentation of the search results has been inhibited to be presented.

In some embodiments, the received text corresponding to the search query is received from a human annotator and the system further comprises: means for determining whether the search query would cause one or more search results to be presented; in response to the determining that the search query causes the second plurality of search results to be presented, means for causing an indication of the determination to the human annotator to be presented along with a request to modify the search query; means for receiving additional search queries from the human annotator and determining whether each of the additional search queries would cause one or more search results to be presented; and means for determining whether the content rating score should be adjusted in response to the search query, the additional search queries, and the one or more search results response to the search query and the additional search queries.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
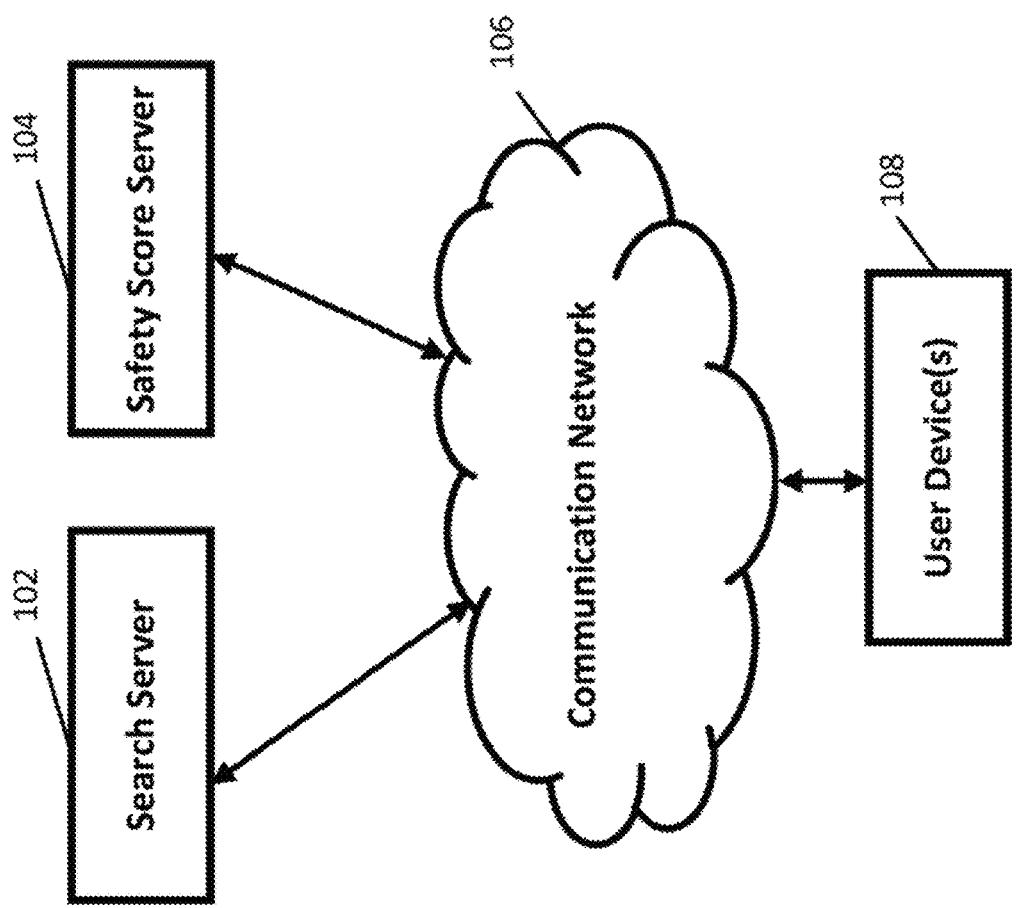
FIG. 1 shows a schematic diagram of an example of a system for presenting search results in accordance with some embodiments of the disclosed subject matter.

In accordance with various embodiments, mechanisms (which can include methods, systems, and media) for presenting search results are provided.

In some embodiments, the mechanisms described herein can receive a search query from a user device, and can determine if the search query is to be blocked based on information related to search results retrieved in connection with the search query. If it is determined that the search query is to be blocked, the mechanisms can cause an indication that the search query has been blocked to be presented on the user device. If it is determined that the search query is not to be blocked, the mechanisms can cause some or all of the retrieved search results to be presented on the user device. In some embodiments, the determination of whether the search query is to be blocked can be made regardless of a language in which the search query is written.

In some embodiments, the mechanisms can determine that a search query is to be blocked using any suitable techniques. For example, in some embodiments, the mechanisms can determine a proportion of search results that are associated with content indicated as being safe for presentation (e.g., to children of a particular age), and can determine that the search query is not to be blocked if the proportion exceeds a threshold. As another example, in some embodiments, the mechanisms can generate a distribution of content ratings or class of content ratings associated with the search results, and can calculate a skew of the distribution to determine if the search results are skewed towards content suitable toward a particular demographic (e.g., suitable for children, suitable for adults, and/or any other suitable demographic). As yet another example, in some embodiments, the mechanisms can determine a classification associated with the search query indicating the relative safety of search results associated with the query. Particular examples of classifications can include: queries that children are likely to search for and are likely to produce safe content, queries that children are likely to search for and are likely to produce mature content, queries that children are unlikely to search for and/or should not search for, neutral queries (e.g., those that are broad) and may produce mature content, and/or queries likely to produce particular types of mature content (e.g., sexual content, violence, drug use, and/or any other types of mature content).

In some embodiments, in response to determining that the search query is not to be blocked, the mechanisms can identify a subset of search results to be presented. For example, in some embodiments, if the search query is determined to be safe (e.g., based on a proportion of mature content associated with search results returned from the query, based on a classification of the query, and/or based on any other suitable information), all search results associated with particular content ratings or particular classes of content ratings (e.g., those that are suitable for all ages, and/or any other suitable content ratings or classes of content ratings) can be presented. As another example, if the search query is determined to be possibly safe (e.g., based on a determination that the proportion of mature content associated with the search results is in a particular range and/or based on a classification of the query), the mechanisms can identify particular search results to be presented. In some such embodiments, the search results can be identified based on any suitable information, such as content ratings or classes of content ratings associated with the search results, popularity of the search results, relevance of the search results to the search query, and/or any other suitable information.

The mechanisms described herein can be used in multiple applications. For example, in some embodiments, search queries that tend to retrieve search results associated with mature content can be identified and can be blocked, preventing mature results from being presented to a particular user or to a particular device. As another example, in some embodiments, search queries that are directed to broad search terms (e.g., a single word, a name of a country, etc.) that tend to retrieve a broad range of search results that may include both safe and unsafe content can be identified, and further analysis can be conducted to identify a subset of the search results that is deemed to include safe content. As a more particular example, in instances where a search query tends to retrieve both safe and unsafe search results, the mechanisms described herein can cause search results that are mislabeled as being safe for presentation to not be presented, for example, by ranking search results based on relevance to the search query, relative safety of search results that are frequently visited in connection with the search result, popularity of the search result with a particular demographic (e.g., children, and/or any other suitable demographic), and/or any other suitable information. These mechanisms can, for example, be implemented to reduce the exposure to such risks.

It should be noted that, although the embodiments described herein relate to video content and, in response to receiving a search query, presenting search results from a corpus of video content, the mechanisms described herein can be used to present search results from any suitable corpus. For example, in some embodiments, the corpus can include audio content (e.g., music, radio programs, audiobooks, and/or any other suitable content), games, electronic documents (e.g., emails, e-books, and/or any other suitable electronic documents), and/or any other suitable corpus of content.

Turning to FIG. 1, an example 100 of hardware for providing search results responsive to a search query that can be used in accordance with some embodiments of the disclosed subject matter is shown. As illustrated, hardware 100 can include one or more servers, such as a search server 102 and a safety score server 104, a communication network 106, and one or more user devices 108.

Search server 102 can be any suitable server for receiving a search query, determining whether the search query is to be blocked, and/or determining which search results to present in response to the search query. For example, in some embodiments, search server 102 can determine whether a search query is to be blocked based on information indicating a proportion of search results associated with a particular content rating or class of content rating, as shown in and described below in connection with FIGS. 3-5. Additionally or alternatively, in some embodiments, search server 102 can determine whether a search query is to be blocked based on information indicating the relevance of search results to a particular search query. As another example, in some embodiments, search server 102 can determine which search results retrieved based on the search query are to be presented. In a more particular example, in some embodiments, search server 102 can identify which search results are to be presented based on a relevance of the search results to the search query, as described below in connection with FIGS. 4 and 5. In some embodiments, search server 102 can be omitted.

Safety score server 104 can be any suitable server for calculating a score indicating a suitability of a particular search query. For example, in some embodiments, safety score server 104 can calculate the score by retrieving search results associated with the search query and determining a proportion of the retrieved search results that are associated with one of two classes of content ratings, as shown in and described below in connection with FIG. 4. It should be noted, however, that any suitable designated content ratings or classes of content ratings can be selected (e.g., determining whether each of the content items included in a set of search results have a content rating that belongs to one of three content rating classes). As another example, in some embodiments, safety score server 104 can calculate the score by generating a distribution of content ratings corresponding to search results associated with the search query and can calculate a skew of the distribution, as described below in connection with FIG. 4. As yet another example, in some embodiments, safety score server 104 can determine a classification associated with a search query, as shown in and described below in connection with FIG. 7. In some embodiments, safety score server 104 can be omitted.

Communication network 106 can be any suitable combination of one or more wired and/or wireless networks in some embodiments. For example, communication network 106 can include any one or more of the Internet, a mobile data network, a satellite network, a local area network, a wide area network, a telephone network, a cable television network, a WiFi network, a WiMax network, and/or any other suitable communication network.

User device(s) 108 can include any one or more user devices suitable for entering search queries and/or presenting search results. For example, in some embodiments, user device(s) 108 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 108 can include non-mobile devices such as a desktop computer, a set-top box, a television, a streaming media player, a game console, or any other suitable non-mobile device.

Although search server 102 and safety score server 104 are illustrated as separate devices, any one or more of these devices can be combined into one device in some embodiments. Also, although only one search server 102 and one safety score server 104 are shown in FIG. 1 to avoid over-complicating the figure, any suitable number of each of these devices can be used in some embodiments.

Although only one user device 108 is shown in FIG. 1 to avoid over-complicating the figure, any suitable number of each of these devices, and any suitable types of these devices, can be used in some embodiments.

Figure 2:
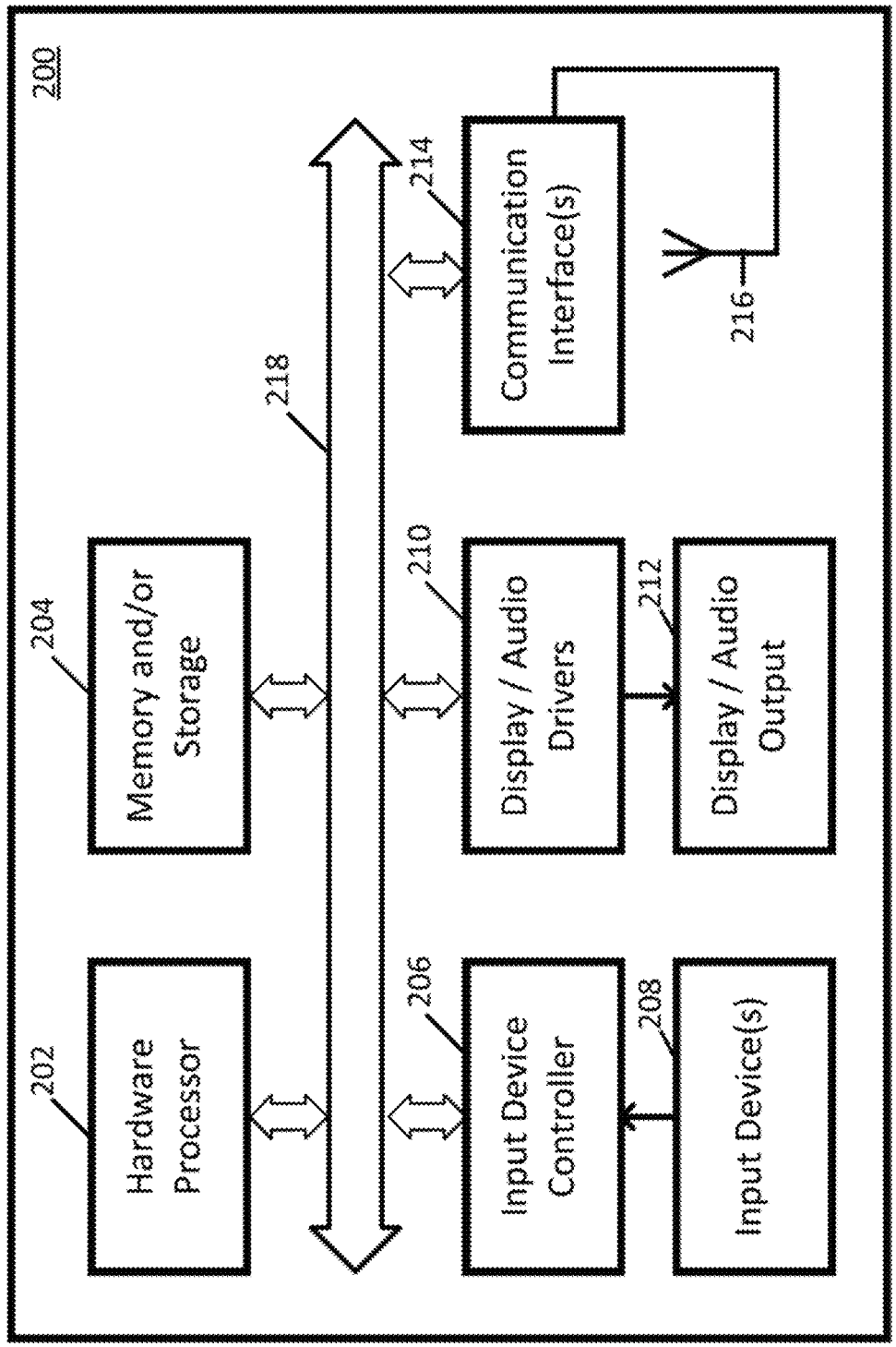
FIG. 2 shows an example of hardware that can be used in a server and/or a user device in accordance with some embodiments of the disclosed subject matter.

Search server 102, safety score server 104, and user device 108 can be implemented using any suitable hardware in some embodiments. For example, in some embodiments, devices 102, 104, and 108 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 106 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
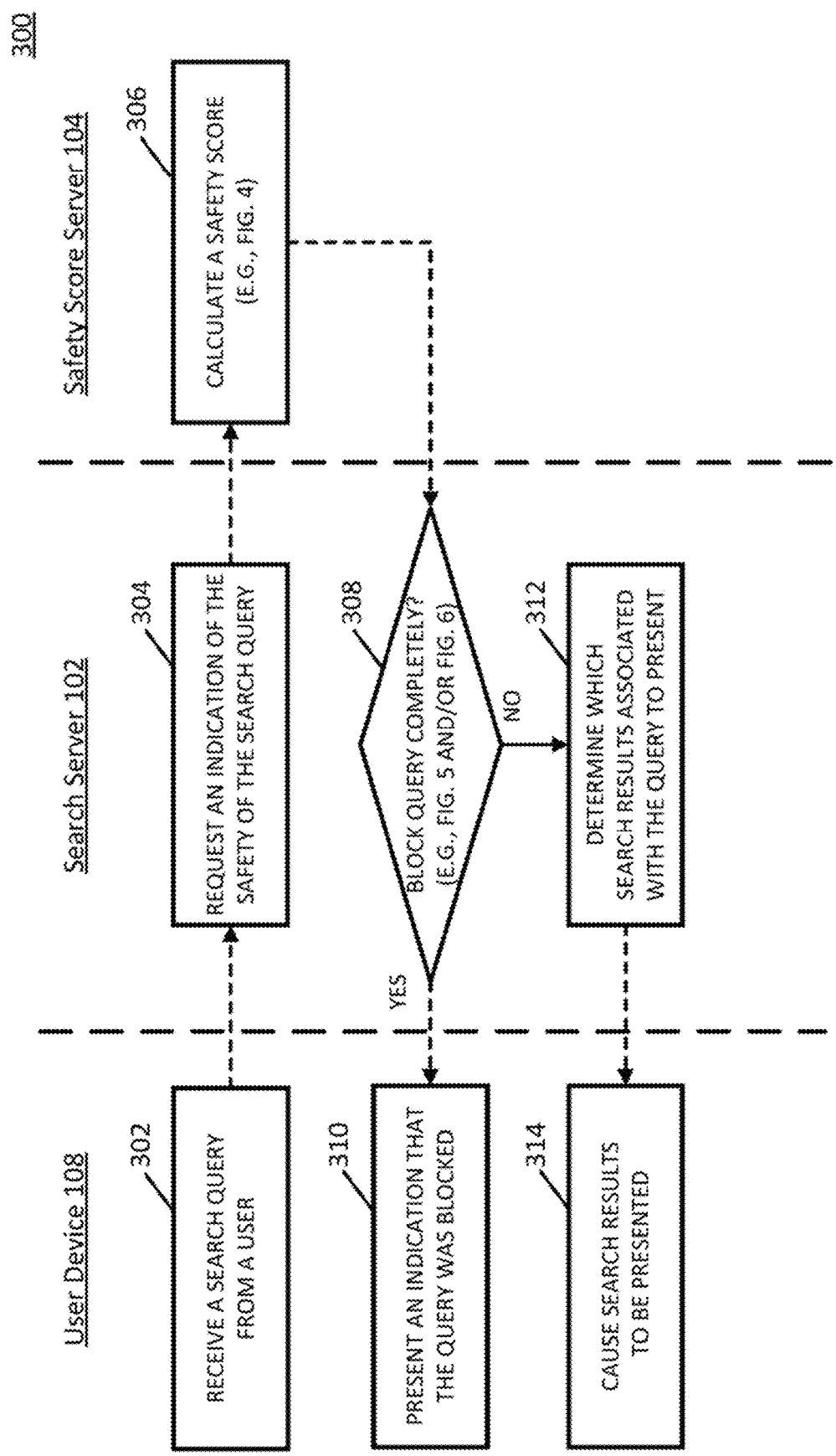
FIG. 3 shows an example of an information flow diagram for presenting search results in accordance with some embodiments of the disclosed subject matter.

Turning to FIG. 3, an example 300 of an information flow diagram for determining whether a search query is to be blocked and, if it is determined that the search query is not to be blocked, presenting search results retrieved based on the query is shown in accordance with some embodiments of the disclosed subject matter. In some embodiments, information flow diagram 300 can be implemented on user device 108, search server 102, and/or safety score server 104.

User device 108 can begin by receiving a search query from a user at 302. The search query can correspond to a search of any suitable corpus of content. For example, in some embodiments, the search query can correspond to a search of video content. As another example, in some embodiments, the search query can correspond to a search of a database that includes any suitable information (e.g., information related to media content, information related to documents, and/or any other suitable information). In some embodiments, the search query can include any suitable characters and can be of any suitable length. In some embodiments, the search query can be received in any suitable manner. For example, in some embodiments, the search query can be received as text input received from a keyboard and/or a touchscreen, as text input converted using speech recognition techniques from spoken speech received through a microphone of user device 108, and/or received in any other suitable manner.

At 304, search server 102 can receive the search query and can request information indicating the safety of the search query from safety score server 104. In some embodiments, the received information can include information indicating content ratings or classes of content ratings associated with search results retrieved in association with the search query. For example, in some embodiments, the received information can indicate a proportion of search results associated with content corresponding to a particular content rating or class of content ratings (e.g., suitable for all ages, and/or any other suitable content rating). As another example, in some embodiments, the received information can indicate a skew of a distribution of content ratings associated with the search results, as described below in connection with block 406 of FIG. 4. In some embodiments, the requested information can be used to determine whether the search query is to be blocked (as described below in connection with block 308) and/or to determine which search results associated with the search query are to be presented (as described below in connection with block 312).

Note that, in some embodiments, search server 102 can parse the received search query in any suitable manner and can review search results retrieved based on the parsed portions of the search query. For example, in some embodiments, search server 102 can parse the received search query to determine an intent of the search query. As a more particular example, in some embodiments, search server 102 can parse the received search query to determine that particular words and/or phrases are directed to and/or are related to mature content. In some embodiments, search server 102 can parse the search query using any suitable technique(s). For example, in some embodiments, search server 102 can determine words and/or phrases related (e.g., synonyms, an entity type associated with a particular name in the query, words that appear frequently with words and/or phrases in the query, and/or any other suitable related words and/or phrases) to those included in the search query. In some embodiments, in response to determining that a search query is directed to and/or related to mature content, search server 102 can cause the search query to be blocked (e.g., by presenting an indication that no search results will be presented).

At 306, safety score server 104 can calculate a safety score in response to receiving the request from search server 102. Safety score server 104 can calculate the safety score using any suitable information and suitable technique(s). For example, in some embodiments, safety score server 104 can retrieve an unfiltered group of search results associated with the search query and can determine a proportion of the search results that are associated with a particular content rating or class of content ratings (e.g., suitable for all ages, and/or any other suitable content rating or class of content ratings), as shown in and described below in connection with FIG. 4. As another example, in some embodiments, safety score server 104 can determine a classification (e.g., that the query is likely to be associated with mature content, that the query is likely to not be associated with mature content, that the query is one that children are not likely to and/or should not enter, and/or any other suitable classification) associated with the search query, as shown in and described below in connection with FIG. 6. Note that, in some instances, a safety score and/or a classification may have been previously determined for a particular search query. In some such embodiments, safety score server 104 can access a database of stored safety scores and/or stored classification corresponding to previously analyzed search queries rather than calculating the score and/or the classification. Safety score server 104 can then transmit the safety score to search server 102.

At 308, search server 102 can determine whether to block the search query based on the received safety score using any suitable information and any suitable technique(s). For example, in some embodiments, search server 102 can determine that the query is to be blocked completely (that is, that no search results are to be presented) in response to determining that a proportion of search results associated with the query that correspond to particular content rating(s) or class(es) of content ratings (e.g., suitable for all ages, and/or any other suitable content rating) is below a predetermined threshold (e.g., less than 50% of the search results, and/or any other suitable proportion). As another example, in some embodiments, search server 102 can determine that the query is not to be blocked in response to determining that a proportion of search results associated with the search query to correspond to unsuitable content (e.g., only suitable for adults, and/or any other suitable content rating) is below a predetermined threshold. As yet another example, in some embodiments, search server 102 can determine that the search query is to be partially blocked in response to determining that the proportion of search results associated with the query that correspond to particular content rating(s) or class(es) of content ratings (e.g., suitable for all ages, and/or any other suitable content rating) is within a predetermined range (e.g., between 50% and 90% of the search results, and/or any other suitable range). A more particular example of a process for determining whether to block the search query is shown in and described below in connection with FIG. 5. As still another example, in some embodiments, search server 102 can determine that the search query is to be blocked in response to determining that the search query is associated with a particular classification (e.g., one that children do not and/or should not search for, one that is associated with search results corresponding to mature content, and/or any other suitable classification), as shown in and described below in connection with FIG. 6.

In some embodiments, the predetermined threshold at which search server 102 determines that a search query is to be blocked or allowed can be determined based on any suitable information. For example, in some embodiments, the predetermined threshold can be determined based on parameters associated with the search query itself, such as a length of the search query (e.g., a number of words and/or characters of the search query) and/or the length and/or complexity of individual words in the search query. As a more particular example, in some embodiments, in response to determining that the search query has more than a particular number of words and/or an average word length greater than a predetermined threshold value (for example, indicating that the search query was entered by an older child, a teenager, and/or an adult), search server 102 can determine that the proportion of search results associated with classes of content ratings indicating that the content is suitable for children can be relatively lower than for a shorter search query and/or a search query with a shorter average word length. As another example, in some embodiments, the predetermined threshold value can be calculated based on viewing patterns associated with a user account authenticated on user device 108. As a more particular example, if it is determined that content corresponding to particular classes of content ratings (e.g., suitable for teenagers, suitable for adults, and/or any other suitable content ratings) have been presented, search server 102 can determine that the proportion of search results indicated as suitable for all ages can be relatively lower.

Note that, in some embodiments, search server 102 can determine that a search query is to be blocked completely based on information indicating that the search query has been previously flagged by users (e.g., children, parents, teachers, and/or any other suitable user) as being an unsuitable query and/or one that is likely to generate search results associated with mature content. In some embodiments, search server 102 can receive such indications from users and can store indications of flagged search queries for future use.

If, at 308, it is determined that the search query is to be blocked completely ("yes" at 308), user device 108 can present an indication that the search query has been blocked at 310. For example, in some embodiments, user device 108 can present a message indicating that the search query was blocked and that no search results are being returned in response to the query, as shown in and described below in connection with FIG. 8A. In some embodiments, the message can indicate a reason for blocking the search query, for example, indicating that the query was determined to be directed at mature content (e.g., only suitable for adults, and/or any other suitable type of content) and/or determined to be directed at a particular type of mature content (e.g., violence, sexual content, profanity, and/or any other type of mature content).

Note that, in some embodiments, verification that blocked search queries were correctly blocked, that not-to-be-blocked or allowed search queries were correctly allowed, and measuring the blockage of particular queries (e.g., non-children-inappropriate queries relating to "foreign policy" or "tax preparation") can be performed in any suitable manner. For example, in some embodiments, a search query that was blocked can be compared to a stored list of search queries that have been previously determined to be unsafe (e.g., are associated with a high proportion of mature content). As a more particular example, in some embodiments, words and/or phrases of the blocked search query can be compared to words and/or phrases on the list of unsafe search queries. As another example, in some embodiments, blocked search queries can be manually verified (e.g., by a human annotator). Furthermore, in some embodiments, a list of manually verified search queries can include those that were submitted by human annotators and were determined to retrieve an unsuitable proportion of mature content, rather than search queries that were initially flagged to be blocked and were subsequently verified manually. In some such embodiments, manually verified search queries can be stored to verify other search queries that have been blocked.

Figure 5:
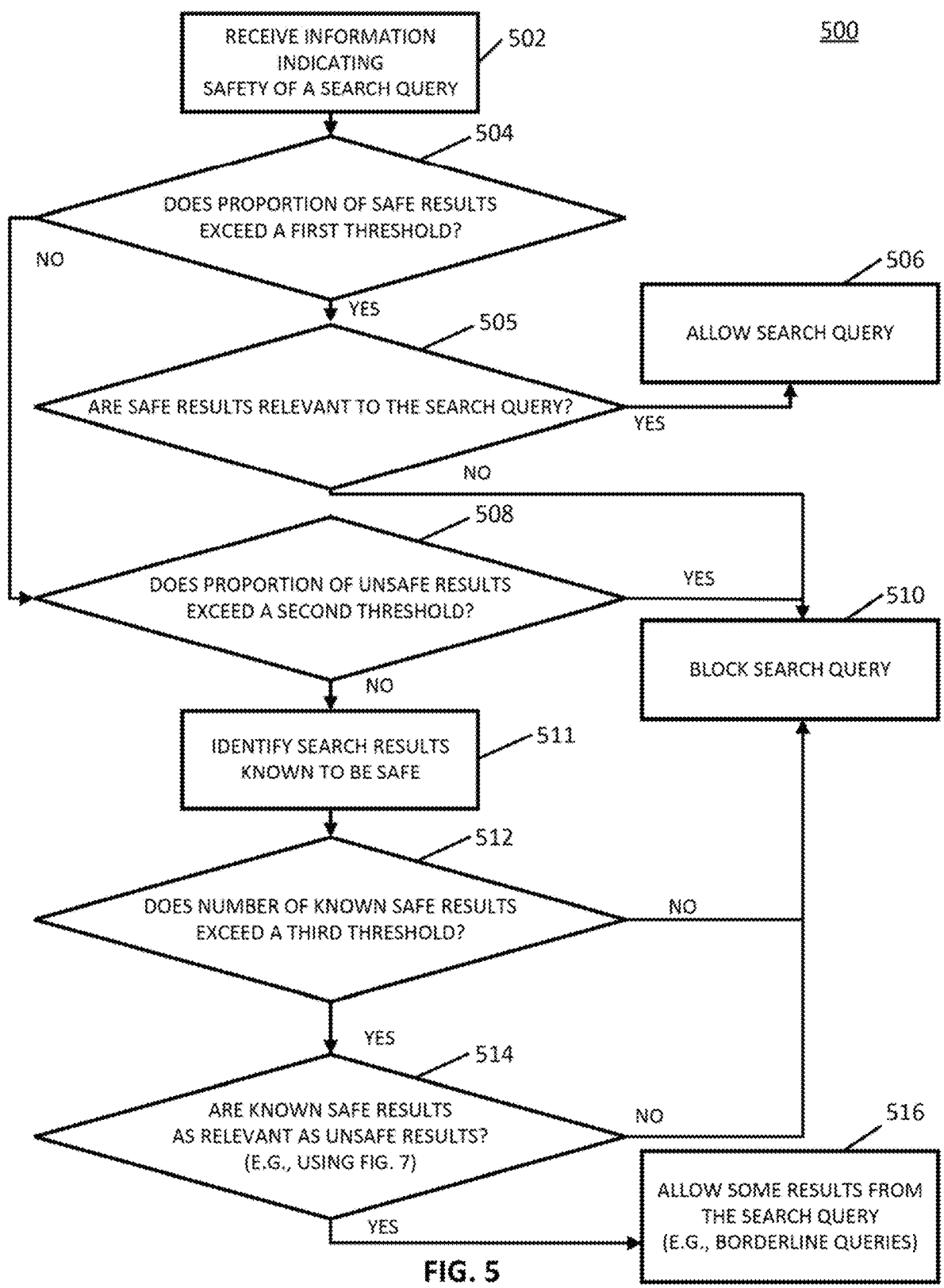
FIG. 5 shows an example of a process for determining whether a search query is to be blocked in accordance with some embodiments of the disclosed subject matter.

Note also that, although the above-mentioned verification features can be used to determine whether queries were correctly blocked by, for example, an application executing process 500 of FIG. 5, this is merely illustrative. Alternatively, in some embodiments, these verification features can be used to evaluate whether search queries are correctly being blocked or whether some search queries will be correctly blocked by an application executing process 500 of FIG. 5 or other processes described herein.

In this example, an interactive verification process can begin by providing one or more human annotators with an interface for evaluating at least a portion of the application executing the processes described herein. In a more particular example, the interactive verification process can request that one or more human annotators evaluate the application by providing an interface for inputting search queries that would cause the receipt of unsafe content.

In some embodiments, the interface can be a search query interface or any other suitable interface that includes a field for receiving a search query that is provided by an application executing process 500 of FIG. 5, which receives a search query and determines whether to allow or block the search query. Alternatively, the interface can be a search query interface that provides a portion of the features provided by an application executing process 500 of FIG. 5. For example, the interface can include a search field for inputting a search query and an interactive element that transmits the search query to a safety score server or any other suitable server (e.g., a "Get Results" button).

In some embodiments, the interactive verification process can transmit an instruction to a human annotator to attempt to receive unsafe content by providing a text input, a voice input, or any other suitable input in any suitable language into a search input interface.

It should be noted that any suitable instruction can be presented to the one or more human annotator. For example, in some embodiments, the interactive verification process can transmit multiple instructions to a human annotator—e.g., one instruction to input a search query into a search input interface that the human annotator believes would retrieve unsafe content and another instruction to review search results and indicate whether one or more of the search results include unsafe content.

Figure 6:
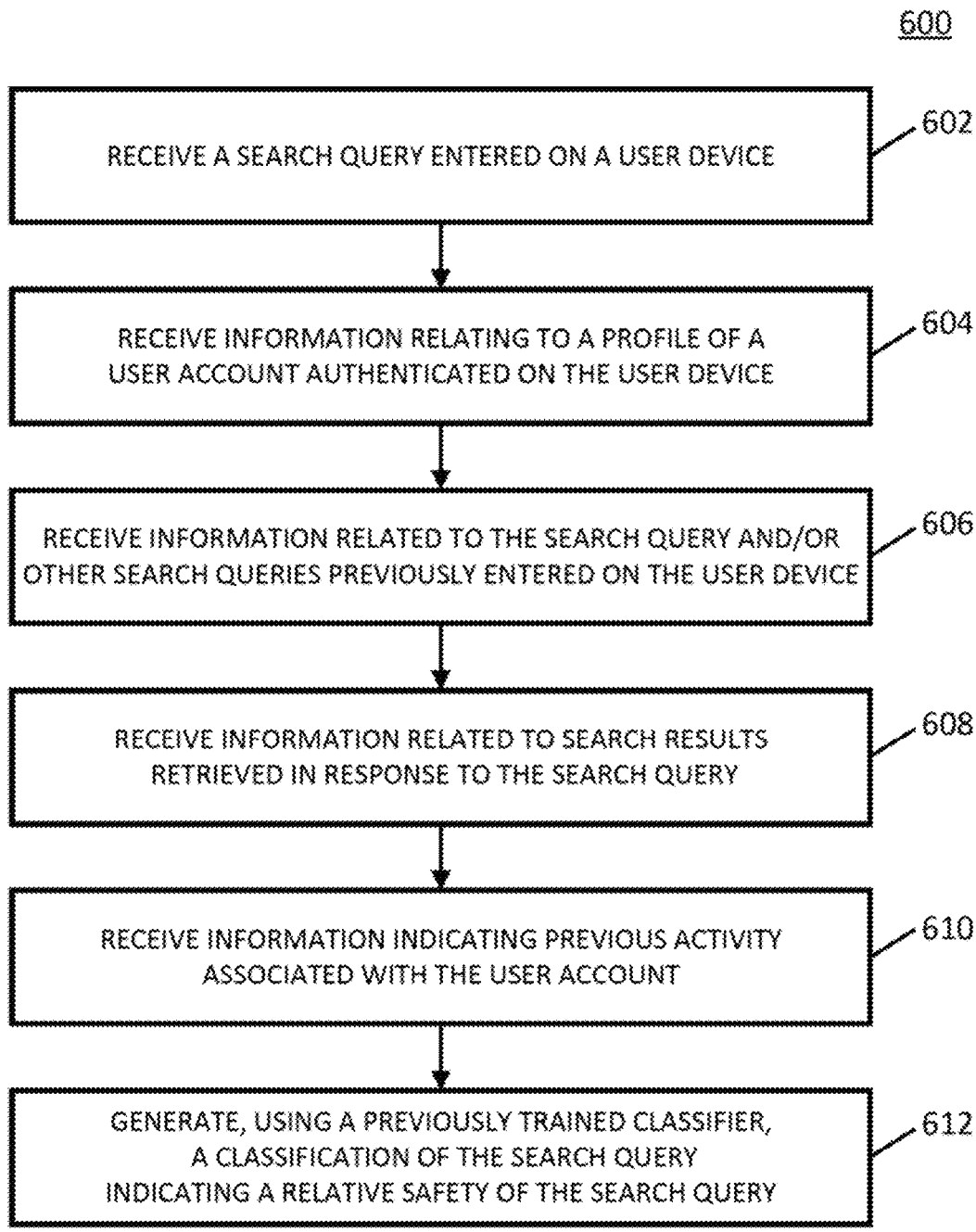
FIG. 6 shows an example of a process for classifying a search query in accordance with some embodiments of the disclosed subject matter.

In some embodiments, in response to receiving a candidate search query from a human annotator, the interactive verification process can transmit the candidate search query to identify search results that are to be presented (e.g., as described in connection with block 312 of FIG. 3), to calculate a safety score (e.g., as described in connection with FIGS. 3 and 4), and/or to determine whether a search query is to be blocked (e.g., as described in connections with FIGS. 3, 5, and 6). In a more particular example, the interactive verification process can transmit the candidate search query to a safety score server, where the safety score server returns a response indicating whether the candidate search query was allowed or blocked. In this example, if the candidate search query is determined to be allowed, a subset of search results (e.g., the top five, the top ten, etc.) that are responsive to the candidate search query can be presented in the interface. Continuing with this example, the interactive verification process can prompt the human annotator to provide a subsequent candidate search query in a further attempt to retrieve unsafe search results. For example, based on the feedback that candidate search query was allowed, the interactive verification process can prompt the human annotator to provide a refined or otherwise modified search query that may obtain unsafe content. In another example, the interactive verification process can present the human annotator with a list of inputted search queries such that the progression of search queries and their associated results can be reviewed (e.g., [SEARCH QUERY 1] . . . [SEARCH QUERY N], where each is color coded to indicate whether the query was blocked or allowed or indicates queries with unsafe content). Alternatively, if the candidate search query is determined to be blocked, the interactive verification process can transmit an indication to the human annotator that the user was successful in obtaining unsafe search results for the inputted search query (e.g., a mature intent query). For example, while the embodiments described herein may present no search results in response to blocking an inputted search query, the indication provided by the interactive verification process can include a message or notification indicating that no safe search results are responsive to the inputted search query (e.g., "Annotator A: There are no good results for your query.").

In some embodiments, in response to receiving the subset of search results responsive to the candidate search query, the interactive verification process can transmit a request to the human annotator to review the subset of search results and indicate whether each search result is safe for presentation. In a more particular example, the human annotator can be presented with a set of criterion for determining whether a search result is safe for presentation (e.g., "Is the result safe for children under the age of 5?").

In response to processing the candidate search queries and/or the received indications as to whether a search result is deemed to be safe for presentation, the interactive verification process can use such evaluation data in any suitable manner. For example, the interactive verification process can review the candidate search queries that were inputted by human annotators and that obtained unsafe search results and adjust one or more parameters of the classifiers of the safety score server (e.g., threshold values, weights, ranges of safety scores, etc.). Additionally or alternatively, the interactive verification process can provide a recommendation or an indication that at least a portion of the classifiers operating in the safety score server needs further evaluation (e.g., additional candidate search queries, additional adjustment of threshold values or weights, etc.).

Referring back to FIG. 3, if, at 308, it is determined that the search query is not to be blocked completely ("no" at 308), search server 102 can determine which search results associated with the search query are to be presented at 312. Search server 102 can use any suitable technique or combination of techniques to identify the search results that are to be presented. For example, in some embodiments, search server 102 can select the search results based on the relative safety score and/or the classification of the search query. As a more particular example, if the safety score indicates that the proportion of search results associated with the query that are associated with mature content is below a predetermined threshold (e.g., less than 50%, less than 40%, and/or any other suitable proportion), search server 102 can determine that all search results associated with particular content rating(s) or classes of content ratings (e.g., a content rating or class of content rating indicating that the content is suitable for all ages, a content rating or class of content rating that is determined to be of interest to children, and/or any other suitable rating) are to be presented.

As another example, if the safety score indicates that the proportion of search results associated with the query that are associated with mature content ratings or class of mature content ratings is within a particular range (e.g., between 50 and 90%, between 40 and 80%, and/or any other suitable range) as shown in and described below in connection with FIG. 5, search server 102 can determine that only particular search results are to be presented. In some embodiments, the particular search results can include those that are determined to be of interest to children and/or those that are predicted to be associated with a particular content rating or classes of content ratings (e.g., suitable for all ages, and/or any other suitable rating) with a particular level of certainty (e.g., greater than 70% confidence, greater than 80% confidence, and/or any other suitable level of certainty). In some embodiments, the level of certainty of an assignment of a content rating or class of content ratings to a search result can be determined based on any suitable classification techniques. As a specific example, a classifier used to assign content ratings or classes of content ratings to search results can store an indication of a confidence value associated with the assigned content rating or class of content ratings. In some embodiments, the content rating or class of content ratings can be determined based on any suitable information, such as search terms that have been used to retrieve the search result, demographics of visitors to the search result, a popularity of the search result, a time of day during which the search result is typically accessed, and/or any other suitable information.

In some embodiments, search server 102 can rank a group of candidate search results retrieved based on the search query based on any suitable information (e.g., content rating or class of content ratings, relevance to the search query, date of creation of content associated with the search result, viewing statistics associated with media content viewed from the user device, and/or any other suitable information) or combination of information, and can select a subset of the group of candidate search results based on the ranking. As a more particular example, in some embodiments, search server 102 can cause search results associated with content corresponding to a particular content rating or classes of content ratings (e.g., suitable for all ages, and/or any other suitable content rating) to be more highly ranked. As another more particular example, in some embodiments, search server 102 can cause search results corresponding to a particular content rating or class of content ratings that are also determined to be of a particular level of relevance to the search result (e.g., determined as described below in connection with FIG. 7) to be more highly ranked. As yet another more particular example, in some embodiments, search server 102 can cause search results related to media content items that have been recently (e.g., within the last day, within the last week, and/or any other suitable time period) presented (e.g., on user device 108 and/or any other user device associated with a user account authenticated on user device 108) to be more highly ranked. As still another more particular example, in some embodiments, search server 102 can cause search results related to media content items that have been recently presented to be ranked lower.

In some embodiments, search server 102 can determine whether a particular search result (e.g., one that is not associated with a content rating and/or one in which the content rating is likely to be incorrect) is suitable for presentation when selecting the search results to present. For example, in some embodiments, search server 102 can determine a confidence value associated with a content rating or class of content ratings of a search result, and can determine that further analysis is required if the confidence value is below a predetermined threshold (e.g., below 90% confidence, below 80% confidence, and/or any other suitable value). Search server 102 can determine whether an unrated search result and/or a search result associated with a content rating or class of content ratings assigned with low confidence is to be presented using any suitable information. For example, in some embodiments, search server 102 can identify content ratings associated with content that is frequently watched in connection with and/or recommended based on viewing of the search result. As another example, in some embodiments, search server 102 can determine that a search result associated with a rating indicating that the content is suitable for presentation and assigned with a high confidence value (e.g., greater than 80% confidence, and/or any other suitable value) is to be presented. In some such embodiments, the confidence value associated with a particular search result can be considered more heavily in response to determining that a search query is associated with both safe content and mature content. As yet another example, in some embodiments, search server 102 can determine if a content rating or class of content ratings has been assigned to a content item associated with the search result in any other content rating database (e.g., one that stores information relating to particular movies, videos, television programs, video games, and/or any other suitable content).

In some embodiments, the safety score calculated at block 306 can be determined using content ratings or classes of content ratings associated with an unfiltered (e.g., not restricted to any particular content rating(s) or classes of content ratings) group of search results associated with the search query. In some such embodiments, search server 102 can perform a second search to determine which results associated with the search query are to be presented. For example, in some embodiments, the second search can be filtered using any suitable content ratings or class(es) of content ratings. As a more particular example, in some embodiments, the second search can be restricted to content which is indicated as suitable for all ages, suitable for children younger than a particular age, and/or any other suitable content.

Note that, in some embodiments, search server 102 can determine that no search results are to be presented based on any suitable information. For example, in some embodiments, search server 102 can determine that no search results are to be presented in response to determining that fewer than a predetermined number of search results (e.g., fewer than five, fewer than ten, and/or any other suitable number) are associated with particular content rating(s) or classes of content ratings (e.g., suitable for all ages, and/or any other suitable rating). Note that, in some instances, this can occur even if the proportion of mature content in the search results is relatively low, for example, if there are relatively few search results returned for the search query. Additionally, note that this can occur in instances where the top ranked results associated with the search query correspond to mature content. As another example, in some embodiments, search server 102 can determine that no search results are to be presented based on the relevance of the search results to the search query. For example, search server 102 can determine that no search results are to be presented if the most relevant search result (e.g., determined using the techniques shown in and described in connection with FIG. 7) does not meet a threshold level of relevance. As another example, in some embodiments, search server 102 can determine that no search results are to be presented if there are fewer than a predetermined number (e.g., fewer than three, fewer than five, and/or any other suitable number) of search results associated with a minimum level of relevance to the search query.

In some embodiments, search server 102 can then transmit an indication of the selected search results to user device 108.

User device 108 can cause the selected search results to be presented at 314. For example, in some embodiments, the search results can be presented in connection with the search query, as shown in and described below in connection with FIG. 8B. In some embodiments, the search results can be presented in any suitable manner. For example, in some embodiments, an individual search result can include any suitable information, such as an indication of a ranking of the search result relative to other returned search results, an indication of a name and/or a title associated with the search result, an indication of a date (e.g., a date of creation, a date of modification, and/or any other suitable date) associated with the search result, and/or any other suitable information. In some embodiments, selection of an individual search result can cause content associated with the search result to be presented. For example, in instances where the search result is associated with a media content item, selection of the search result can cause the media content item to begin being presented on user device 108.

Figure 4:
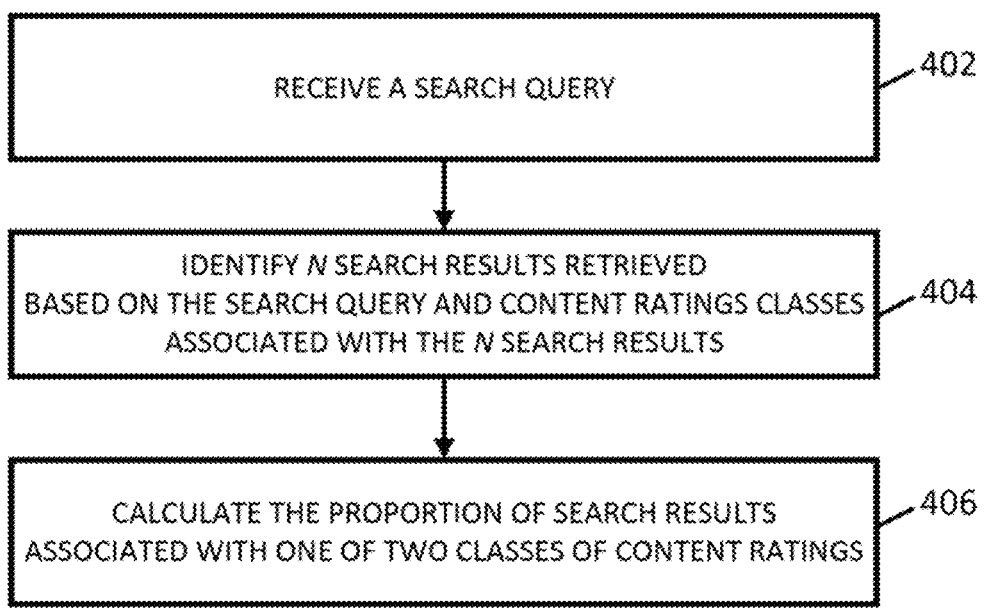
FIG. 4 shows an example of a process for calculating a safety score associated with a search query in accordance with some embodiments of the disclosed subject matter.

Turning to FIG. 4, an example 400 of a process for calculating a safety score associated with a search query is shown in accordance with some embodiments of the disclosed subject matter.

Process 400 can begin by receiving a search query entered on a user device at 402. In some embodiments, process 400 can receive the search query from search server 102, as described above in connection with block 304 of FIG. 3. In some embodiments, the search query can include any suitable characters and can be of any suitable length.

Process 400 can determine the top N (e.g., five, ten, twenty, hundred, thousand, and/or any other suitable number) search results associated with the search query at 404. Process 400 can determine the top N search results using any suitable technique or combination of techniques. For example, in some embodiments, process 400 can use an associated search engine to access search results resulting from a search query and can store the top N results.

In some embodiments, each search result can be associated with a content rating or a class of content ratings. For example, in instances where a search result is associated with an item of media content, the content rating or class of content ratings can indicate whether the media content item includes particular types of content (e.g., sexual content, violence, profanity, and/or any other types of content), suggested minimum ages (e.g., suitable for all ages, suitable for children over a particular age, suitable for adults, and/or any other suitable ages and/or age ranges) to view the content, and/or any other suitable information. As a more particular example, the content ratings can include an indication of a suitable viewing audience, such as "General Audiences," "Children," "Teenagers," "Adults," and/or any other suitable content ratings. In some embodiments, the content rating or class of content ratings can be associated with any suitable content rating system (e.g., a content rating system used by a particular country, a content rating system applied to particular types of content, such as movies, video games, television programs, etc., and/or any other suitable type of content rating system).

The content ratings or class of content ratings associated with search results can be identified and/or stored in any suitable manner. For example, in some embodiments, an indication of the content rating or class of content rating can be stored in association with the search result, and process 400 can access the indication, for example, stored in memory 204 of search server 102 and/or safety score server 104. As another example, in some embodiments, process 400 can identify a content item hyperlinked to the search result. After identifying the content item, process 400 can determine the associated content rating or class of content rating by accessing a database that stores content ratings or classes of content ratings in association with content identifiers (e.g., a name of the content item, an identification number corresponding to the content item, and/or any other suitable identifier). Note that, in some embodiments, process 400 can identify content ratings or classes of content ratings to update previously stored content ratings or classes of content ratings associated with a search result.

In some embodiments, the N retrieved search results can correspond to one of two classes of content ratings. For example, in some embodiments, the two classes of content ratings can correspond to different levels of suitability for children of different ages. As a more particular example, in some embodiments, the two classes of content ratings can correspond to a rating indicating that the content is suitable for all ages and a rating indicating that the content is suitable only for adults. As another particular example, in some embodiments, the two classes of content ratings can correspond to a rating indicating that the content is suitable for all ages and a rating indicating that the content is suitable for children older than a particular age (e.g., seven, 13, and/or any other suitable ages). In some embodiments, the two classes of content ratings can each include multiple content ratings. For example, in some embodiments, a first of the two classes of content ratings can include content that is rated suitable for all ages (e.g., a "G" rating and/or any other suitable designation) and content that is indicated as of interest to children (e.g., a "Y" rating and/or any other suitable designation).

In some embodiments, the N retrieved search results can be filtered to include those corresponding to the two classes of content ratings in any suitable manner. For example, in some embodiments, an indication of a content rating for a search result can be stored in association with the search result, and the two classes of content ratings can be used as search terms to limit the retrieved search results to those corresponding to the two classes of content ratings.

Note that, in some embodiments, process 400 can identify the two classes of content ratings based on any suitable information. For example, in some embodiments, the two classes of content ratings can be identified based on information associated with a user account authenticated on user device 108. As a more particular example, the information can indicate an age of a child associated with user device 108, and the two classes of content ratings can be determined based on the age. As a specific example, if the indicated age is 5, the first class of content ratings can correspond to content that is suitable for children 5 and younger, and the second class of content ratings can correspond to content that is only suitable for adults.

In some embodiments, process 400 can receive, at block 404, a group of search results that are not filtered by content rating or class of content ratings. In some such embodiments, process 400 can remove search results that do not correspond to one of the two classes of content ratings using any suitable technique or combination of techniques. For example, in some embodiments, process 400 can delete any of the top N results identified at block 404 (e.g., from a list of search results, from memory 304 of safety score server 102, and/or from any other suitable location). Additionally or alternatively, in some embodiments, process 400 can store an indication that a particular search result does not correspond to one of the two classes of content ratings in association with an identifier of the search result, rather than removing the search result from the group of top N search results.

Additionally or alternatively, in some embodiments, process 400 can receive an ordered list of classes and can select an upper bound (e.g., the class at the top of the ordered list) and a lower bound (e.g., the class at the bottom of the ordered list) for determining which search results to remove. For example, in some embodiments, the list of classes can be ordered based on age for which the content is suitable (e.g., a first class suitable for all ages, a second class suitable for children seven and younger, a third class suitable for children 13 and younger, and/or any other suitable classes). The upper and lower bounds can then be selected in any suitable manner. For example, in some embodiments, process 400 can then select the lower bound based on content that is to be allowed. As another example, in some embodiments, process 400 can select the upper bound based on content that is to be blocked under all circumstances (e.g., content that is only suitable for adults, and/or any other suitable content). Process 400 can then remove content corresponding to classes of content ratings between the upper and lower bounds.

Note also that, in some embodiments, any suitable number of classes of content ratings can be used. For example, in some embodiments, three or more classes of content ratings can be used, where the lower bound corresponds to content that is to be allowed, the upper bound corresponds to content that is to be blocked, and the middle classes correspond to content that is to be subject to further analysis before presentation. As a more particular example, in some embodiments, the lower bound can correspond to content that is suitable for all ages and/or determined to be of interest to children, the upper bound can correspond to content that is suitable for adults, and the middle classes can correspond to any content associated with intermediate content ratings (e.g., content suitable for children younger than a particular age, unrated content, and/or any other suitable content ratings).

Process 400 can calculate the proportion of search results associated with one of the two classes of content ratings at 406. In some embodiments, process 400 can calculate the proportion using the search results remaining in the group of search results after those not corresponding to one of the two classes of content ratings have been removed. As a specific example, in instances where the two classes of content ratings correspond to content that is suitable for all ages and/or determined to be of interest to children (e.g., "G" and "Y" content) and content that is only suitable for adults (e.g., "MA" and "X" content), process 400 can calculate the proportion of content that is rated as only suitable for adults using the formula:

$$\frac{(MA \& X)}{(MA \& X) + (G \& Y)}$$

where (MA&X) indicates the number of content items associated with MA and/or X content ratings, and (G&Y) indicates the number of content items associated with G and/or Y content ratings. Note that, in some embodiments, the proportion can be calculated without removal of the search results not corresponding to one of the two classes of content ratings. In some such embodiments, search results can be stored in association with an indication of a corresponding content rating, and process 400 can tally the number of search results associated with each of the two classes of content ratings to calculate the proportion.

In some embodiments, the proportion of search results can be weighted based on any suitable information. For example, in some embodiments, a particular search result can be weighted more or less heavily (e.g., as 0.8 search results, as 1.2 search results, and/or any other suitable weighting) in the calculation of the proportion. For example, the weight of a particular search result can be determined based on a relevance of the search result to the search query. As a more particular example, in some embodiments, the N search results can be ranked based on relevance, and more relevant search results (e.g., those that are ranked higher) can be associated with a larger weight. As a specific example, in some embodiments, a weight for a particular search result can be calculated using the formula:

$$\frac{1}{(R+1)^p}$$

where R is the position of the search result in the ranking and p is a value greater than 0 (e.g., 0.1, 0.5, 1, 2, and/or any other suitable value). Continuing with this example, a top-ranked result (e.g., one ranked first) can be associated with an R of 0 or 1, and can receive a higher weighting than a result ranked 100 (associated with an R of 99 or 100). In some embodiments, if the relevance of a particular search result is determined to be below a predetermined threshold (e.g., below a particular ranking, and/or any other suitable threshold of relevance), the search result can be omitted from the calculation of the proportion.

In some embodiments, the relevance of a search result to the search query can be determined in any suitable manner. For example, in some embodiments, the relevance can be determined by calculating a score indicating a number of words and/or phrases in the search query that are included in and/or associated with the search result, as described below in connection with block 514 of FIG. 5. As another example, in some embodiments, the relevance can be determined using the techniques shown in and described below in connection with FIG. 7.

As another example, in some embodiments, the weight of a particular search result can be determined based on an information retrieval score associated with the search result. The information retrieval score can be based on any suitable information and can be calculated using any suitable technique(s). For example, in some embodiments, the information retrieval score can include a relevance score associated with the search result, a quality score (e.g., based on a number of times a search result has been viewed, and/or any other suitable metrics) associated with the search result, information indicating a language associated with the search result, information indicating a date associated with the search result (e.g., a date of creation, a date the search result was last modified, and/or any other suitable date), and/or any other suitable metrics. In some embodiments, the weight can be a scaled version of the information retrieval score, such as the logarithm of the information retrieval score, the information retrieval score raised to a power, the information retrieval score scaled by a constant, and/or any other suitable scaling method.

As yet another example, in some embodiments, the weight of a particular search result can be determined based on a popularity of the search result. As a more particular example, in some embodiments, search results that have been selected more often and/or more recently can receive a higher weighting than search results that have been selected less often and/or less recently. As another more particular example, search results associated with content items that users watch for a longer duration of time (e.g., watch completely, watch for more than a particular duration of time, and/or any other suitable metric) can receive a higher weighting than search results that users watch for a shorter duration of time.

As still another example, in some embodiments, the weight of a particular search result can be determined based on co-visitation information associated with the search result. As a specific example, if the search result is frequently (e.g., 5% of visits, 10% of visits, and/or any other suitable percentage) visited before or after a second search result, the weight of the search result can be determined based on information associated with the second search result. In some embodiments, the information associated with the second search result can include any suitable information, such as a content rating or class of content ratings associated with the second search result, a popularity metric (e.g., as described above) associated with the second search result, and/or any other suitable information. As a specific example, if it is determined that the second search result is generally considered to be safe (e.g., is associated with a content rating or class of content ratings indicating that the search result does not contain mature content and/or is suitable for all ages), a ranking and/or a weight of the particular search result can be increased and/or updated in any other suitable manner.

In some embodiments, the weight of a particular search result can be calculated based on any suitable combination of information. For example, in some embodiments, information indicating a relevance of a search result to the search query can be combined with information indicating an information retrieval score associated with a search result and the search query. As a more particular example, the weight can be based on a product of the relevance and a measurement associated with the information retrieval score, such as the relevance multiplied by the information retrieval score and/or the relevance multiplied by a scaled version of the information retrieval score. As another example, in some embodiments, the weight can be based on a combination of the relevance, the information retrieval score, and/or a popularity metric. Note that, in some embodiments, a search result can be associated with multiple weights, and each can correspond to a different type of information. For example, in some embodiments, a first weight can be assigned based on an information retrieval score, a second weight can be assigned based on relevance of the search result to the query, and a third weight can be assigned based on popularity of the search result. The multiple weights can then be applied to the search result using any suitable mathematical operation(s) (e.g., one or more of the weights can be added to a score associated with the search result, one or more of the weights can be multiplied to a score associated with the search result, and/or any other suitable operation(s)).

In some embodiments, process 400 can transmit the proportion of search results associated with one of the two classes of content ratings (that is, the safety score) to any device that requested information indicating suitability of a particular search query, such as search server 102 as described above in connection with block 304 of FIG. 3.

Note that, in some embodiments, process 400 can analyze a distribution of content ratings associated with the N search results rather than, or in addition to, calculating the proportion of search results associated with one of the two classes of content ratings. For example, in some embodiments, process 400 can generate a distribution that indicates the number of search results corresponding to different content ratings or classes of content ratings (e.g., a number indicated as safe for all ages, a number indicated as suitable for teenagers, a number indicated as safe for adults only, and/or any other suitable content ratings). Process 400 can then calculate any suitable statistics of the distribution. For example, in some embodiments, process 400 can calculate a skew of the distribution. As a more particular example, in some embodiments, process 400 can determine whether the distribution is more skewed towards search results that are suitable for all ages or more skewed towards search results that are suitable for adults only. As a specific example, in some embodiments, process 400 can determine that the distribution has a positive skew, indicating that the right side of the distribution is larger (e.g., is long-tailed, fat-tailed, and/or any other suitable metric) and that there are more search results associated with mature content than search results that are deemed suitable for all ages. As another specific example, in some embodiments, process 400 can determine that the distribution has a negative skew, indicating that the left side of the distribution is larger and that there are more search results deemed suitable for all ages than search results associated with mature content. In some embodiments, a skew of a distribution of content ratings or classes of content ratings can be quantified using any suitable metrics, such as a kurtosis of the distribution, a Pearson skewness coefficient, and/or any other suitable metric. In some embodiments, process 400 can calculate any other suitable statistics, such as a mean content rating, a median content rating, a mode content rating, a standard deviation of content ratings, an interquartile range of the content ratings, and/or any other suitable statistics. In some embodiments, one or more statistics associated with the distribution can be used to determine whether a search query is to be blocked, for example, by search server 102 as described above in connection with block 308 of FIG. 3. For example, if the distribution of search results is determined to be skewed towards mature content by more than a particular amount, search server 102 can determine that the search query is to be blocked. As another particular example, if it is determined that the mean, median and/or mode of the distribution is associated with content that is suitable for all ages, and the standard deviation is determined to be less than a predetermined threshold, search server 102 can determine that the search query is to be allowed.

Note that, although filtering of search results to exclude search results not corresponding to a designated class of content ratings and/or removal of search results not corresponding to a designated class of content rating is described herein prior to calculation of a proportion of search results and/or analysis of a distribution of search results, this is merely illustrative. In some embodiments, process 400 can calculate the proportion and/or analyze the distribution of search results using any suitable search results and/or all search results. For example, in some embodiments, multiple proportions of search results corresponding to any suitable classes of content ratings can be calculated. As a specific example, a proportion of content that is suitable for teenagers and suitable for adults can be calculated out of the total number of search results. As another example, in some embodiments, analysis of a distribution of search results can be calculated using all search results, regardless of content rating or class of content ratings. Furthermore, in some embodiments, the group of search results can additionally include search results that are not associated with a content rating or class of content ratings.

Turning to FIG. 5, an example 500 of a process for determining whether to allow or block a search query is shown in accordance with some embodiments of the disclosed subject matter.

Process 500 can begin by receiving information indicating safety of a search query at 502. For example, in some embodiments, the received information can include information related to search results retrieved in connection with the search query. As a more particular example, in some embodiments, the received information can indicate a number and/or a proportion of search results associated with a particular content rating or class of content ratings (e.g., suitable for all ages, suitable for children of a particular age, suitable only for adults, and/or any other suitable content rating). As another more particular example, in some embodiments, the received information can indicate a skew of a distribution of content ratings corresponding to the search results. As yet another more particular example, in some embodiments, the received information can indicate relevance of the search results to the search query and/or to a particular demographic (e.g., children of a particular age, and/or any other suitable demographic).

Process 500 can determine if a proportion of search results indicated as being safe for presentation exceeds a first predetermined threshold at 504. In some embodiments, search results can be indicated as being safe based on any suitable criteria. For example, in some embodiments, search results can be indicated as being safe based on a content rating or class of content ratings associated with a search result. As a more particular example, in some embodiments, search results associated with content ratings indicating that the content is suitable for a particular age (e.g., all ages, children over a particular age, and/or any other suitable age) can be considered safe. As another more particular example, in some embodiments, search results associated with content ratings that indicate the content does not contain particular types of mature content (e.g., violence, sexual content, drug use, profanity, and/or any other suitable types of mature content) can be considered safe. Note that, in some embodiments, the number and/or proportion of search results indicated as being safe for presentation can be determined based on any suitable information and/or criteria, and may be different from search results indicated as being safe for presentation as determined in connection with block 312 of FIG. 3.

The first predetermined threshold can be any suitable proportion (e.g., 50%, 70%, 90%, and/or any other suitable proportion). In some embodiments, the first predetermined threshold can be determined based on any suitable information. For example, in some embodiments, the first predetermined threshold can be determined based on information associated with a user of user device 108. For example, in some embodiments, the user can indicate a level of safety desired, for example, through a user interface presented on user device 108. As a more particular example, in some embodiments, the user can indicate how restrictive process 500 is to be in determining whether a search query is to be blocked and/or whether particular types of mature content are to be blocked.

If, at 504, it is determined that the proportion of search results indicated as being safe for presentation exceeds the first predetermined threshold ("yes" at 504), process 500 can determine if the safe search results are relevant to the search query at 505. Process 500 can determine relevance of a search result to the search query using any suitable information and/or technique(s). For example, in some embodiments, the relevance can be determined on a number of words in the search query that are present in the search result, a popularity of the search result, and/or any other suitable information. A more particular example of a process for determining relevance of a search result to the search query is shown in and described below in connection with FIG. 7. In some embodiments, process 500 can determine an aggregate relevance score for some and/or all of the safe search results. For example, in some embodiments, process 500 can calculate a minimum, a maximum, a mean, and/or any other suitable metric of relevance scores for a group of safe search results. Process 500 can then determine whether or not the safe search results are relevant to the search query by determining if the aggregate relevance score exceeds a predetermined threshold.

If, at 505, it is determined that the safe search results are relevant to the search query ("yes" at 505), process 500 can allow the search query at 506. Process 500 can then allow some or all search results associated with the search query to be presented, as described above in connection with block 312 of FIG. 3.

If, at 504, it is determined that the proportion of search results indicated as being safe for presentation does not exceed the first predetermined threshold ("no" at 504), process 500 can determine if a proportion of search results indicated as being unsafe for presentation exceeds a second predetermined threshold at 508. Similarly as described above in connection with block 504, the search results can be indicated as being unsafe based on any suitable criteria, such as content ratings or classes of content ratings associated with the search results. For example, search results associated with content ratings indicating that the content is suitable for particular ages (e.g., for adults only, for teenagers, and/or any other particular ages) and/or contains particular types of mature content can be considered unsafe.

The second predetermined threshold can be any suitable proportion (e.g., 20%, 30%, and/or any other suitable proportion). Similarly to the first predetermined threshold, the second predetermined threshold can be determined based on any suitable information, such as information associated with a user of user device 108, as described above in connection with block 504.

If, at 508, it is determined that the proportion of search results indicated as being unsafe for presentation exceeds the second predetermined threshold ("yes" at 508), process 500 block the search query completely at 510. As described above in connection with block 310 of FIG. 3, an indication that the search query has been blocked can be presented on user device 108.

If, at 508, it is determined that the proportion of search results indicated as being unsafe for presentation does not exceed the second predetermined threshold ("no" at 508), process 500 can identify a group of search results that have been determined to be safe with a particular criteria at 511. For example, in some embodiments, the group of search results can be those that have been determined to be safe to present with greater than a particular confidence value (e.g., greater than 80% confidence, greater than 90% confidence, and/or any other suitable value). As a more particular example, in some embodiments, the group of search results can be those that have been determined to be associated with particular classes of content ratings (e.g., suitable for all ages, determined to be of interest to children, and/or any other suitable class of content ratings) with greater than a particular confidence value. In some embodiments, the search results included in the group of search results that have been determined to be safe with a particular criteria can be those considered to be particularly safe for presentation.

The group of search results can include any suitable number (e.g., zero, five, ten, twenty, and/or any other suitable number) of search results. In some embodiments, the group of search results can be a subset of the safe search results identified in block 504.

Process 500 can determine if the number of search results identified in the group of search results determined to be particularly safe for presentation (that is, those identified above in connection with block 511) exceeds a third predetermined threshold at 512. In some embodiments, the third predetermined threshold can be any suitable number (e.g., one, two, three, five, ten, and/or any other suitable number) of search results.

If, at 512, it is determined that the number of search results in the group of search results determined to be particularly safe for presentation does not exceed the third predetermined threshold ("no" at 512), process 500 can block the search query at 510.

If, at 512, it is determined that the number of search results in the group of search results determined to be particularly safe for presentation exceeds the third predetermined threshold ("yes" at 512), process 500 can determine if the relevance of search results in the group of search results is similar to and/or greater than the relevance of search results considered to be unsafe at 514. The relevance of search results to the search query can be determined in any suitable manner and using any suitable technique(s). For example, in some embodiments, the relevance can be determined based on a score indicating how often words and/or phrases included in the search query appear in a search result. As a more particular example, in some embodiments, search results that include a larger proportion of words and/or phrases included in the search query can receive a higher relevance score than search results that include a smaller proportion of words and/or phrases included in the search query. As another example, in some embodiments, the relevance can be determined based on information indicating how relevant the search result is to a particular demographic (e.g., children of a particular age, and/or any other suitable demographic). As a more particular example, if the search query is a word and/or phrase that could indicate a broad range of content items (e.g., a name of a band, a name of a children's television show, and/or any other suitable content items that are directed to both children and adults), process 500 can determine that search results associated with content items of interest to children (e.g., cartoons, a television program directed to children, and/or any other suitable content items) are to be considered more relevant than those not of interest to children. As another example, in some embodiments, the relevance can be determined using the technique(s) shown in and described below in connection with FIG. 7.

In some embodiments, process 500 can calculate an aggregate relevance score for safe results (e.g., an average of the relevance scores for a subset and/or all search results indicated as being safe for presentation, a weighted average, a minimum score, a maximum score, and/or any other suitable type of aggregate score) and an aggregate relevance score for unsafe results and can compare the two aggregate relevance scores to determine if the two aggregate scores are similar and/or if the safe search results are more relevant to the search query than the unsafe results. In some embodiments, the subset of safe and/or unsafe search results that are selected for calculation of the aggregate relevance scores can be based on any suitable information, such as a ranking of the search results, relevance of the search results to the search query, and/or any other suitable information. For example, in some embodiments, search results determined to be most relevant and/or most highly ranked can be included in the subset. In some embodiments, aggregate relevance scores for safe results that are lower than for unsafe results can be considered similar if the difference between the unsafe aggregate relevance scores and the safe aggregate relevance scores is less than a predetermined number (e.g., less than 1, less than 0.1, and/or any other suitable number) can be considered to be similar. As a specific example, if an aggregate relevance score associated with safe results is 0.2, and an aggregate relevance score associated with unsafe results is 0.15, process 500 can determine that safe results are more relevant than unsafe results. As another specific example, if an aggregate relevance score associated with safe results is 0.3, and an aggregate relevance score associated with unsafe results is 0.35, process 500 can determine that the difference in relevance scores is 0.05, and can determine whether the difference is less than a predetermined threshold (e.g., less than 0.05, less than 0.1, and/or any other suitable value). In some such embodiments, aggregate relevance scores where the difference is less than the predetermined threshold can be considered to be similar.

If, at 514, it is determined that the relevance of the safe results in the group of search results determined to be particularly safe for presentation is not similar and/or greater than the relevance of the unsafe results ("no" at 514), process 500 can block the search query at 510.

If, at 514, it is determined that the relevance of the safe results in the group of search results determined to be particularly safe for presentation is similar and/or greater than the relevance of the unsafe results ("yes" at 514), process 500 can allow a subset of search results retrieved based on the search query to be presented at 516. For example, as described above in connection with block 312 of FIG. 3, the subset of search results can be determined based on any suitable information and/or using any suitable technique(s). For example, in some embodiments, only search results determined to be of interest to children (e.g., based on a content rating or class of content ratings) can be presented. Additionally or alternatively, in some embodiments, search results determined to be relevant and/or popular can be presented. In some embodiments, the presented search results can be selected from the group of search results identified in connection with block 511 (e.g., those considered to be particularly safe for presentation).

Turning to FIG. 6, an example 600 of a process for classifying a search query is shown in accordance with some embodiments of the disclosed subject matter. In some embodiments, process 600 can be executed to determine if a search query is to be blocked, as described above in connection with block 308 of FIG. 3.

Process 600 can begin by receiving a search query entered on a user device at 602. As described above, the search query can include any suitable number of words and/or phrases and any suitable characters.

Process 600 can receive information related to a profile associated with a user account authenticated on the user device at 604. In some embodiments, the user account can correspond to an account on any suitable service and/or web site, such as a media content sharing service, a social networking site, and/or any other suitable service and/or web site. In some embodiments, the profile can include any suitable information relating to a user of the user account. For example, in some embodiments, the profile can indicate demographic information associated with the user, such as an age, gender, and/or any other suitable information. As another example, in some embodiments, the profile can indicate information about the user device on which the user account is authenticated, such as a name and/or model number of the user device, whether the user has used particular input modes on the user device (e.g., a microphone and/or speech recognition technology, a touchscreen, and/or any other suitable input modes), an interaction speed (e.g., a typing speed, a gesture speed, and/or any other suitable interaction speed) of the user using the user device, and/or any other suitable user device information. As yet another example, in some embodiments, the profile can indicate whether the user is currently logged-in to the user account and/or whether the user account is shared between multiple users. As still another example, in some embodiments, the profile can indicate an Internet Protocol (IP) address currently associated with the user device. As a more particular example, in some embodiments, the IP address can indicate whether the user device is currently at a school, a library, and/or any other particular location.

Process 600 can receive information related to the search query at 606. For example, in some embodiments, the information can include time and/or date information associated with the received search query. As a more particular example, in some embodiments, the information can include a time of day the query was submitted, a day of the week on which the query was submitted, and/or any other suitable time and/or date information. As another example, in some embodiments, the information can include an indication of particular phrases contained in the search query. As a specific example, if the received query is "video starring Bob Brown," the information can indicate that the query includes four words, that the words "Bob" and "Brown" form a phrase, and that the phrase indicates the name of a person. In some embodiments, the information can further include an identification of a type of entity (e.g., that the phrase is a name of a person, a name of a band, a name of a television show, a name of a place, and/or any other suitable information) associated with the phrase.

Process 600 can receive information related to search results that would be retrieved in response to the search query at 608. For example, in some embodiments, the information can include an indication of relevance (as described in connection with FIGS. 5 and 7) of a search result to the search query. As another example, in some embodiments, the information can indicate a number of search results that would be retrieved based on the search query and/or a number of search results associated with a particular content rating or class of content ratings. As yet another example, in some embodiments, the information can indicate viewing statistics associated with the search results, such as a number of times the search result has been selected and/or viewed, a number of times a content item associated with the search result has been viewed and/or a number of comments associated with the content item, and/or any other suitable information.

Process 600 can receive information indicating previous activity associated with the user account at 610. For example, in some embodiments, the information can indicate media content items previously viewed (e.g., within the last ten minutes, within the last day, within the last week, and/or over any other suitable time period) using the user account. As a more particular example, in some embodiments, the information can indicate a duration of time that each viewed media content item was presented and/or a fraction of the media content item that was presented. As another example, in some embodiments, the information can indicate other search queries entered on the user device within a particular time period (e.g., within the last ten minutes, within the last day, and/or any other suitable time period).

Process 600 can generate, using a previously trained classifier, a classification of the search query indicating a relative safety of the search query at 612. In some embodiments, the classification can indicate that the search query belong to any suitable group. In some embodiments, the classification groups can include: search queries that are likely to be searched for by a particular group (e.g., children of a particular age) that have a low probability of being associated with mature content, search queries that are likely to be searched for by the particular group that have a high probability of being associated with mature content, search queries that are unlikely to be searched for by the particular group, search queries that are neutral and may be associated with mature content, search queries that are likely related to particular types of mature content (e.g., pornography, violence, drug use, and/or any other types of mature content). As a specific example, a search query that includes the name of a children's television show can be assigned to a classification indicating that the search query is likely to be entered by children and has a low probability of being associated with mature content. As another specific example, a search query corresponding to broad search term (e.g., a name of a country, a single word, and/or any other suitable search term) can be assigned to a classification indicating that the search query is neutral and that some search results may be associated with mature content. In some embodiments, any other suitable classification groups can be included. For example, in some embodiments, a classification can indicate whether or not search results associated with the search query are predicted to meet particular criteria other than safety of the search query, such as whether the search results associated with the search query are primarily directed to content determined to be educational, and/or any other suitable criteria.

In some embodiments, the classifier can be trained using any suitable technique and/or combination of techniques. For example, in some embodiments, the classifier can be trained using any suitable machine learning techniques, such as linear and/or logistic regression, neural networks, stochastic gradient descent, random forests and/or decision trees, any suitable boosting techniques, a nearest neighbor clustering algorithm, and/or any other suitable techniques.

In some embodiments, the generated classification can be transmitted by process 600 to any suitable device, such as search server 102. As described above in connection with blocks 308 and 312 of FIG. 3, search server 102 can then use the classification to determine if the search query is to be blocked and/or which search results associated with the search query are to be presented.

Figure 7:
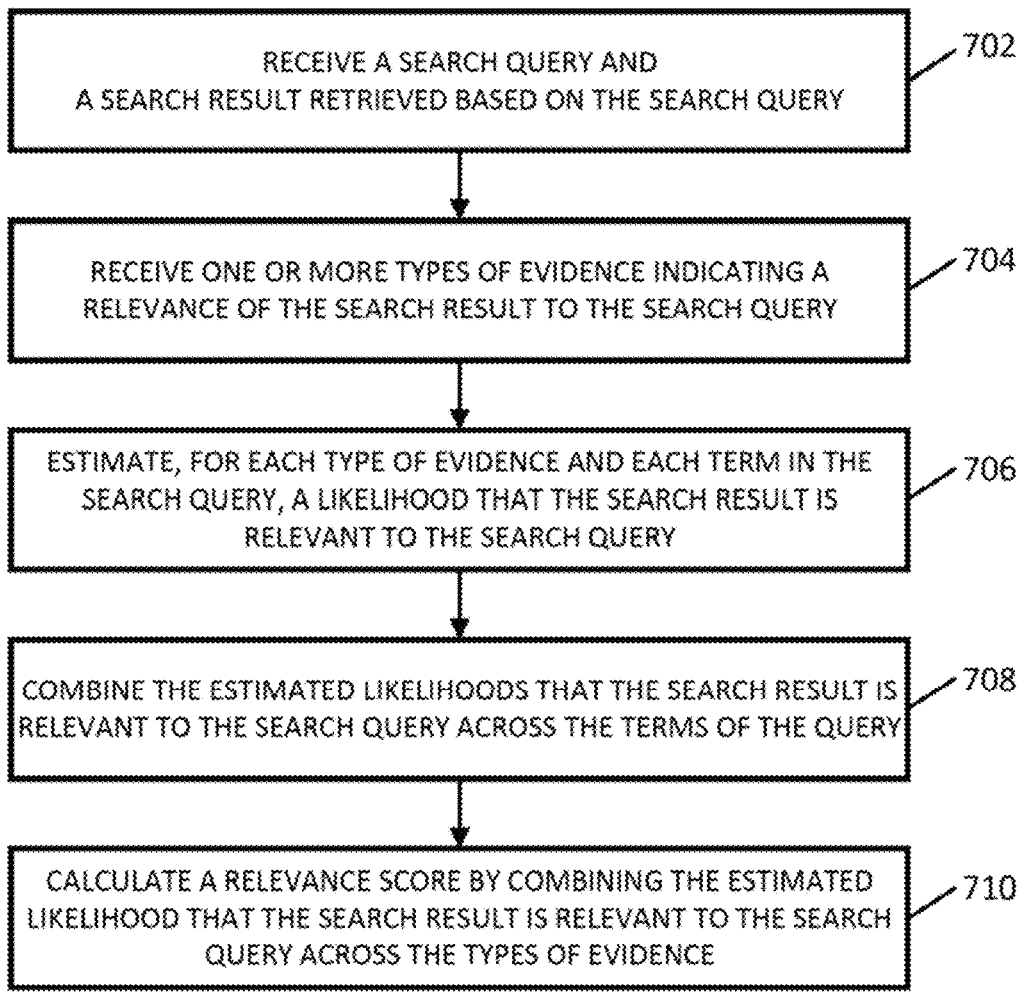
FIG. 7 shows an example of a process for calculating a relevance score of a search query and an associated search result in accordance with some embodiments of the disclosed subject matter.

Turning to FIG. 7, an example 700 of a process for calculating a relevance score of a search result to a search query is shown in accordance with some embodiments of the disclosed subject matter. In some embodiments, the technique(s) described in connection with process 700 can be implemented by any suitable device and/or process to determine a relevance of a search result to a search query.

Process 700 can begin by receiving a search query and a search result retrieved based on the search query at 702. As described above, the search query can include any suitable number of words and/or phrases. In some embodiments, each word and/or phrase can be considered a term of the search query. As a specific example, if the search query is "video starring Bob Brown," "video," "starring," "Bob," "Brown," and/or "Bob Brown" can each be considered terms of the search query. Additionally, the search result can be retrieved using any suitable technique and/or combination of techniques, as described above.

Process 700 can receive one or more types of evidence indicating a relevance of the search result to the search query at 704. For example, in some embodiments, the one or more types of evidence can include: a number of times words and/or phrases included in the search query are included in the search result (e.g., in a title of the search result, in a description of the search result, in metadata associated with the search result, and/or in any other portion of the search result), a number of times the search result has been previously selected when retrieved based on the search query, a number of views associated with a content item corresponding to the search result, and/or any other suitable information.

Process 700 can estimate, for each type of evidence and for each term in the search query, a likelihood that the search result is relevant to the search query at 706. As a specific example, if a type of evidence is a number of times words and/or phrases of the search query are included in the search result and the search term is "Bob Brown," process 700 can determine that there is a higher likelihood that a search result with a title of "Bob Brown Biography" is related to the search query than a search result with a title of "Sam Smith Speech." The likelihood can be estimated using any suitable information. For example, in some embodiments, the likelihoods can be determined using logs of past search queries and/or search results. Additionally, the likelihood can be estimated using any suitable statistical and/or machine learning techniques, such as a neural network, Bayesian statistics, regression, and/or any other suitable techniques.

Process 700 can combine the estimated likelihoods that the search result is relevant to the search query across the terms of the search query at 708, resulting in an estimated likelihood that the search result is relevant to the search query as a whole for each type of evidence. As a specific example, if there are three types of evidence received at 704, process 700 can generate three estimated likelihoods, each corresponding to one of the three types of evidence. The estimated likelihoods corresponding to each search term and each type of evidence can be combined in any suitable manner. For example, in some embodiments, the estimated likelihood corresponding to each term in the search query for a single type of evidence can be combined using a harmonic mean, a weighted harmonic mean, an average, and/or any other suitable method. As a specific example, if the likelihoods that the terms "video," "starring," and "Bob Brown" to a search term based on one type of evidence are "0.2," "0.5," and "0.7," the harmonic mean and/or a weighted harmonic mean of "0.2," "0.5," and "0.7" can be calculated. In embodiments where a weighted harmonic mean is used, weights for each term can be computed using any suitable information.

Process 700 can calculate a relevance score by combining the estimated likelihoods that the search result is relevant to the search query across the types of evidence. As a specific example, if the search query is "video starring Bob Brown," and there are three types of evidence, process 700 can combine the three likelihoods (that is, one for each type of evidence) calculated at block 708 that the search result is relevant to "video starring Bob Brown." Similarly to at block 708, the likelihoods can be combined in any suitable manner, such as a harmonic mean, a weighted harmonic mean, an average, and/or any other suitable method.

In some embodiments, the relevance score can then be used by any suitable user device and/or process, for example, to identify search results that are to be presented (e.g., as described above in connection with block 312 of FIG. 3), to calculate a safety score (e.g., as described above in connection with FIGS. 3 and 4), and/or to determine whether a search query is to be blocked (e.g., as described above in connections with FIGS. 3, 5, and 6).

Figure 8A:
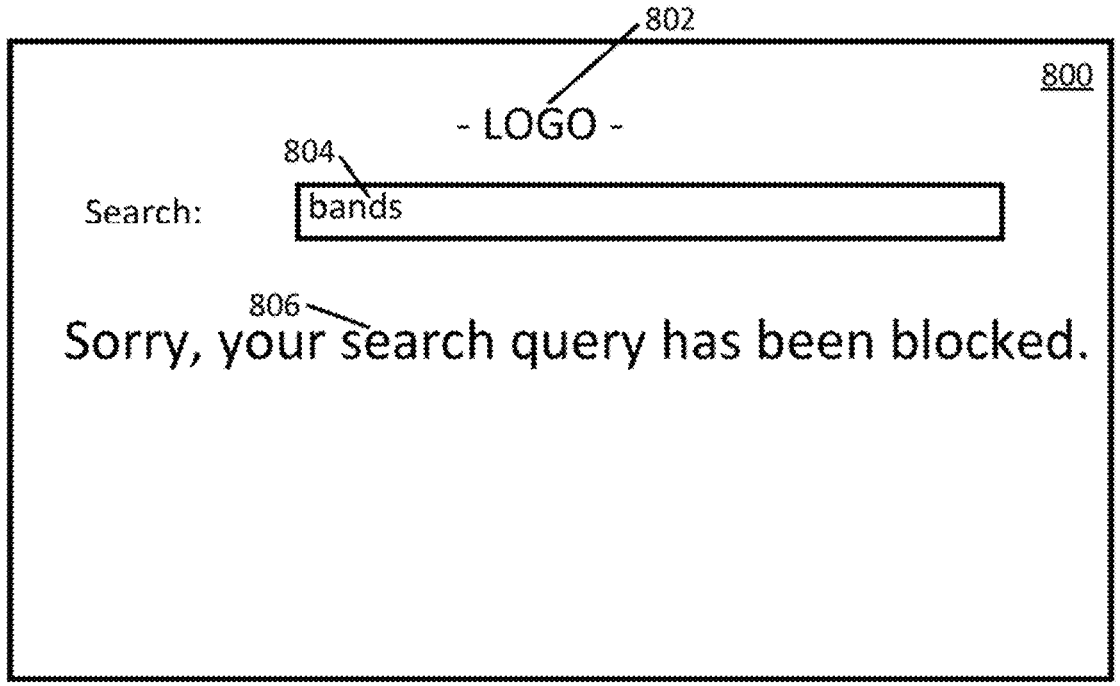
FIGS. 8A and 8B shows examples of user interfaces for indicating that a search query has been blocked and for presenting search results retrieved based on a search query, respectively, in accordance with some embodiments of the disclosed subject matter.

Turning to FIG. 8A, an example 800 of a user interface for indicating that a search query has been blocked is shown in accordance with some embodiments of the disclosed subject matter. As illustrated, user interface 800 can include a logo 802, a search query input 804, and a blocked query indication 806.

Logo 802 can be any suitable logo associated with a provider of user interface 800. In some embodiments, logo 802 can include any suitable text, images, icons, animations, graphics, videos, and/or any other suitable content. Note that the position of logo 802 in user interface 800 is shown as an example, and logo 802 can be located at any suitable position. In some embodiments, logo 802 can be omitted.

Search query input 804 can be any suitable user interface control for receiving a search query from the user device. For example, as shown in FIG. 8A, search query input 804 can include a text input box, which can receive text from any suitable source, such as a keyboard, a touchscreen keypad, a microphone, and/or any other suitable source.

Blocked query indication 806 can be any suitable indication that a search query entered in search query input 804 has been blocked. For example, as shown in FIG. 8A, blocked query indication 806 can include text stating that the search query has been blocked. In some embodiments, blocked query indication 806 can include text indicating a reason that the search was blocked, for example, stating that the query was determined to pertain to mature content. In some embodiments, blocked query indication 806 can include any suitable hyperlinks, images, icons, graphics, animations, and/or any other suitable content. For example, in some embodiments, a hyperlink included in blocked query indication 806 can link to a page that explains how and/or why particular search queries has been blocked.

Figure 8B:
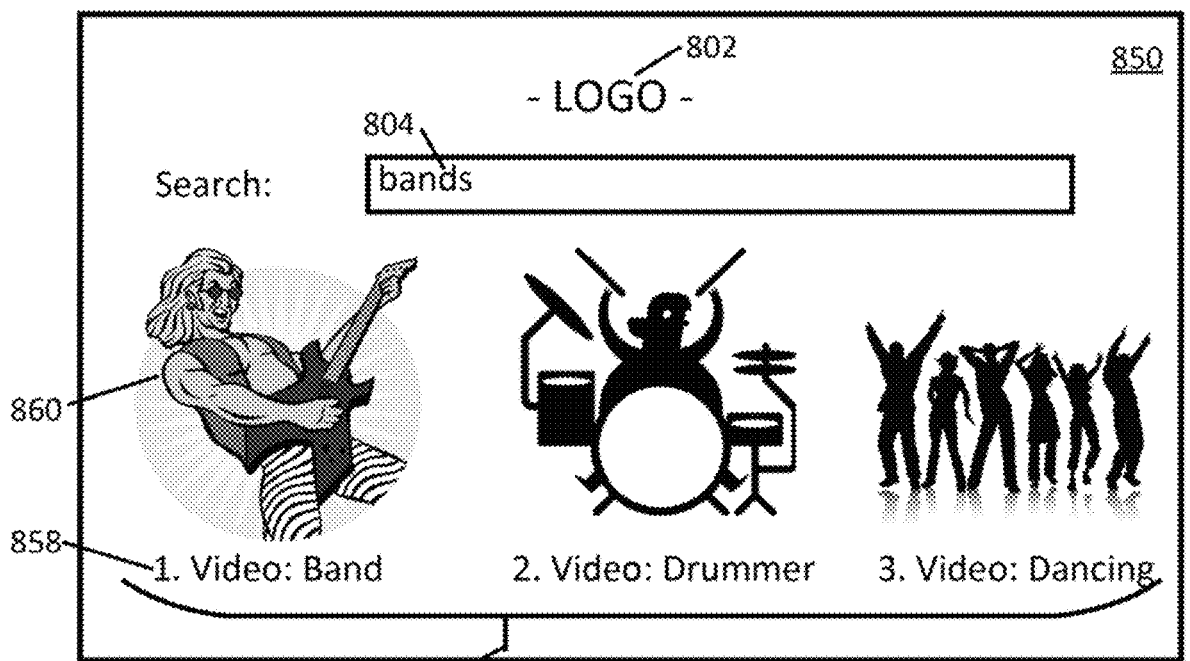

Turning to FIG. 8B, an example 850 of a user interface for presenting search results retrieved based on a search query is shown in accordance with some embodiments of the disclosed subject matter. As illustrated, user interface 850 can include a group of search results 856.

Group of search results 856 can include any suitable number (e.g., one, two, five, ten, twenty, and/or any other suitable number) of individual search results, such as individual search result 858. In some embodiments, individual search result 858 can include any suitable information, such as a ranking associated with the search result, a title associated with the search result, a date (e.g., a date of creation, a date of modification, and/or any other suitable date) associated with the search result, and/or any other suitable information.

In some embodiments, individual search result 858 can include an image 860. Image 860 can be any suitable image associated with individual search result 858. For example, in instances where individual search result 858 corresponds to a media content item, image 860 can be an image associated with the media content item, such as a screen capture from a video content item, an image associated with a creator of the media content item, and/or any other suitable image. In some embodiments, image 860 can be omitted.

Figure 9:
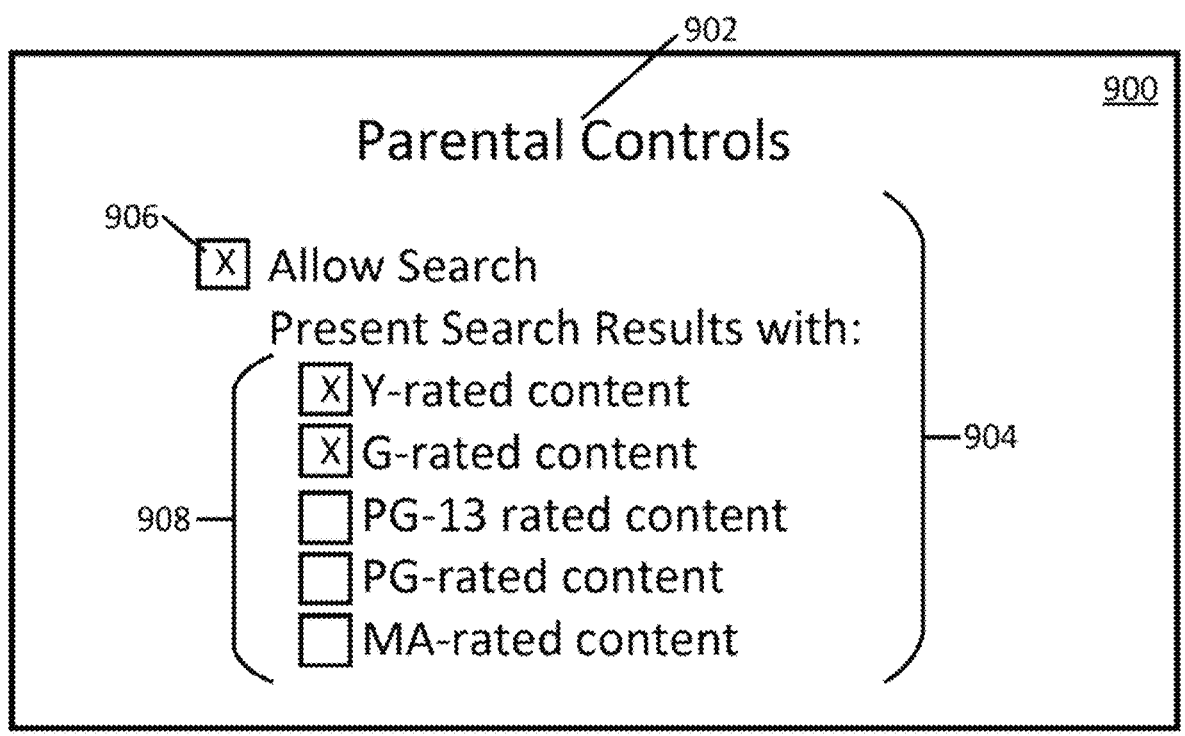
FIG. 9 shows an example of a user interface for receiving user inputs to filter search results in accordance with some embodiments of the disclosed subject matter.

Turning to FIG. 9, an example 900 of a user interface for receiving user inputs (e.g., input from a parent of a child) to allow search queries to be presented and/or filter search results is shown in accordance with some embodiments of the disclosed subject matter. As illustrated, user interface 900 can include a title 902 and a group of inputs 904.

Title 902 can be any suitable title indicating content of user interface 900. In some embodiments, title 902 can include any suitable text, images, graphics, icons, animations, videos, hyperlinks, and/or any other suitable content. Note that the position of title 902 in user interface 900 is shown as an example, and title 902 can be presented at any suitable location. In some embodiments, title 902 can be omitted.

Group of inputs 904 can include any suitable user inputs for indicating that particular features and/or items are to be allowed. An individual input in group of inputs 904 can include any suitable user interface elements, such as radio buttons, checkboxes, text inputs, and/or any other suitable user interface elements.

In some embodiments, group of inputs 904 can include an allow search input 906. In some embodiments, selection of allow search input 906 can allow search queries to be entered and search results to be retrieved and presented based on the entered search query. Similarly, in some embodiments, de-selection of allow search input 906 can cause entry of search queries to be blocked and/or prohibited.

As another example, group of inputs 904 can include group of allowed content inputs 908. In some embodiments, group of allowed content inputs 908 can allow a user to indicate content ratings associated with search results that are safe to be presented. In some such embodiments, only search results corresponding to the selected content ratings will be presented in response to receiving a search query, as described above in connection with block 312 of FIG. 3. Additionally or alternatively, in some embodiments, if there are fewer than a predetermined number (e.g., fewer than five, fewer than ten, and/or any other suitable number) of search results associated with the indicated content ratings, a search query can be blocked completely, as described above in connection with block 308 of FIG. 3.

Although not shown in FIG. 9, in some embodiments, group of inputs 904 can include any other inputs for receiving any suitable information, such as an age of a child, types of mature content that are to be blocked, and/or any other suitable information.

It should be understood that at least some of the above described blocks of the processes of FIGS. 3-7 can be executed or performed in any order or sequence not limited to the order and sequence shown in and described in the figure. Also, some of the above blocks of the processes of FIGS. 3-7 can be executed or performed substantially simultaneously where appropriate or in parallel to reduce latency and processing times. Additionally or alternatively, some of the above described blocks of the processes of FIGS. 3-7 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting search results are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:
1. A method for presenting search results, comprising:
receiving text corresponding to a search query entered on a user device;
determining a predetermined threshold value based on a number of words included in the search query, wherein the predetermined threshold value indicates that search queries having word length greater than the predetermined threshold value were likely to be entered by an adult user and that search queries having word length less than the predetermined threshold value were likely to be entered by a child user, and wherein a proportion of search results associated with search queries entered by the adult user are likely to be associated with content that is unsuitable for the child user;
determining whether a content rating score associated with the search query is below the predetermined threshold value, wherein the score is calculated by:
identifying a first plurality of search results retrieved using the search query, wherein each search result in the first plurality of search results is associated with one of a plurality of content ratings classes;
determining, for each search result in the first plurality of search results, a weight, wherein the weight is determined based on a popularity of the search result; and
calculating the content rating score that is the proportion of search results associated with at least one of the content ratings classes among the first plurality of search results, wherein the proportion of search results associated with at least one of the content ratings classes is calculated using the weight associated with each search result;

in response to determining that the content rating score is below the predetermined threshold value, blocking the first plurality of search results from being presented and identifying a second plurality of search results to be presented based on the search query; and causing the second plurality of search results to be presented on the user device along with an indication indicating a reason for blocking the first plurality of search results.

2. The method of claim 1, wherein the weight is determined based on a relevance of the associated search result to the search query.

3. The method of claim 1, wherein the second plurality of search results is identified based on the content rating class associated with each of the first plurality of search results.

4. The method of claim 1, wherein the second plurality of search results is a subset of the first plurality of search results.

5. The method of claim 1, wherein the plurality of content ratings classes correspond to a first content rating class designated for content that is suitable for all ages and a second content rating class designated for content that is suitable for adults.

6. The method of claim 1, wherein the predetermined threshold value includes a first threshold value and a second threshold value and wherein the method further comprises:
in response to determining that the content rating score is above the predetermined threshold value, determining a first relevance of search results associated with a first of the plurality of content ratings classes to the search query and a second relevance of search results associated with a second of the plurality of content ratings classes to the search query;
determining whether the first relevance is similar to or larger than the second relevance;
in response to determining that the first relevance is similar to or larger than the second relevance, identifying a third plurality of search results to be presented; and
causing the third plurality of search results to be presented on the user device.

7. The method of claim 1, further comprising:
in response to determining that the content rating score is above a second predetermined threshold value, inhibiting presentation of search results based on the search query; and
causing an indication that presentation of the search results has been inhibited to be presented.

8. The method of claim 1, wherein the received text corresponding to the search query is received from a human annotator and wherein the method further comprises:
determining whether the search query would cause one or more search results to be presented;
in response to the determining that the search query causes the second plurality of search results to be presented, causing an indication of the determination to the human annotator to be presented along with a request to modify the search query;
receiving additional search queries from the human annotator and determining whether each of the additional search queries would cause one or more search results to be presented; and
determining whether the content rating score should be adjusted in response to the search query, the additional search queries, and the one or more search results responsive to the search query and the additional search queries.

9. A system for presenting search results, the system comprising:
a hardware processor that is programmed to:
receive text corresponding to a search query entered on a user device;
determining a predetermined threshold value based on a number of words included in the search query, wherein the predetermined threshold value indicates that search queries having word length greater than the predetermined threshold value were likely to be entered by an adult user and that search queries having word length less than the predetermined threshold value were likely to be entered by a child user, and wherein a proportion of search results associated with search queries entered by the adult user are likely to be associated with content that is unsuitable for the child user;
determine whether a content rating score associated with the search query is below the predetermined threshold value, wherein the hardware processor is further programmed to:
identify a first plurality of search results retrieved using the search query, wherein each search result in the first plurality of search results is associated with one of a plurality of content ratings classes;
determine, for each search result in the first plurality of search results, a weight, wherein the weight is determined based on a popularity of the search result; and
calculate the content rating score that is the proportion of search results associated with at least one of the content ratings classes among the first plurality of search results, wherein the proportion of search results associated with at least one of the content ratings classes is calculated using the weight associated with each search result;
in response to determining that the content rating score is below the predetermined threshold value, block the first plurality of search results from being presented and identify a second plurality of search results to be presented based on the search query; and
cause the second plurality of search results to be presented on the user device along with an indication indicating a reason for blocking the first plurality of search results.

10. The system of claim 9, wherein the weight is determined based on a relevance of the associated search result to the search query.

11. The system of claim 9, wherein the second plurality of search results is identified based on the content rating class associated with each of the first plurality of search results.

12. The system of claim 9, wherein the second plurality of search results is a subset of the first plurality of search results.

13. The system of claim 9, wherein the plurality of content ratings classes correspond to a first content rating class designated for content that is suitable for all ages and a second content rating class designated for content that is suitable for adults.

14. The system of claim 9, wherein the predetermined threshold value includes a first threshold value and a second threshold value and wherein the hardware processor is further programmed to:

in response to determining that the content rating score is above the predetermined threshold value, determine a first relevance of search results associated with a first of the plurality of content ratings classes to the search query and a second relevance of search results associated with a second of the plurality of content ratings classes to the search query;

determine whether the first relevance is similar to or larger than the second relevance;

in response to determining that the first relevance is similar to or larger than the second relevance, identify a third plurality of search results to be presented; and cause the third plurality of search results to be presented on the user device.

15. The system of claim 9, wherein the hardware processor is further programmed to:

in response to determining that the content rating score is above a second predetermined threshold value, inhibit presentation of search results based on the search query; and cause an indication that presentation of the search results has been inhibited to be presented.

16. The system of claim 9, wherein the received text corresponding to the search query is received from a human annotator and wherein the hardware processor is further programmed to:

determine whether the search query would cause one or more search results to be presented;

in response to the determining that the search query causes the second plurality of search results to be presented, cause an indication of the determination to the human annotator to be presented along with a request to modify the search query;

receive additional search queries from the human annotator and determining whether each of the additional search queries would cause one or more search results to be presented; and determine whether the content rating score should be adjusted in response to the search query, the additional search queries, and the one or more search results responsive to the search query and the additional search queries.

17. A non-transitory computer-readable medium containing computer executable instructions that, when executed by a processor, cause the processor to perform a method for presenting search results, the method comprising:

receiving text corresponding to a search query entered on a user device;

determining a predetermined threshold value based on a number of words included in the search query, wherein the predetermined threshold value indicates that search queries having word length greater than the predetermined threshold value were likely to be entered by an adult user and that search queries having word length less than the predetermined threshold value were likely to be entered by a child user, and wherein a proportion of search results associated with search queries entered by the adult user are likely to be associated with content that is unsuitable for the child user;

determining whether a content rating score associated with the search query is below the predetermined threshold value, wherein the score is calculated by:

identifying a first plurality of search results retrieved using the search query, wherein each search result in the first plurality of search results is associated with one of a plurality of content ratings classes;

determining, for each search result in the first plurality of search results, a weight, wherein the weight is determined based on a popularity of the search result; and calculating the content rating score that is the proportion of search results associated with at least one of the content ratings classes among the first plurality of search results, wherein the proportion of search results associated with at least one of the content ratings classes is calculated using the weight associated with each search result;

in response to determining that the content rating score is below the predetermined threshold value, blocking the first plurality of search results from being presented and identifying a second plurality of search results to be presented based on the search query; and causing the second plurality of search results to be presented on the user device along with an indication indicating a reason for blocking the first plurality of search results.

18. The non-transitory computer-readable medium of claim 17, wherein the weight is determined based on a relevance of the associated search result to the search query.

19. The non-transitory computer-readable medium of claim 17, wherein the second plurality of search results is identified based on the content rating class associated with each of the first plurality of search results.

20. The non-transitory computer-readable medium of claim 17, wherein the second plurality of search results is a subset of the first plurality of search results.

21. The non-transitory computer-readable medium of claim 17, wherein the plurality of content ratings classes correspond to a first content rating class designated for content that is suitable for all ages and a second content rating class designated for content that is suitable for adults.

22. The non-transitory computer-readable medium of claim 17, wherein the predetermined threshold value includes a first threshold value and a second threshold value and wherein the method further comprises:

in response to determining that the content rating score is above the predetermined threshold value, determining a first relevance of search results associated with a first of the plurality of content ratings classes to the search query and a second relevance of search results associated with a second of the plurality of content ratings classes to the search query;

determining whether the first relevance is similar to or larger than the second relevance;

in response to determining that the first relevance is similar to or larger than the second relevance, identifying a third plurality of search results to be presented; and causing the third plurality of search results to be presented on the user device.

23. The non-transitory computer-readable medium of claim 17, wherein the method further comprises:

in response to determining that the content rating score is above a second predetermined threshold value, inhibiting presentation of search results based on the search query; and causing an indication that presentation of the search results has been inhibited to be presented.

24. The non-transitory computer-readable medium of claim 17, wherein the received text corresponding to the search query is received from a human annotator and wherein the method further comprises:

determining whether the search query would cause one or more search results to be presented;

in response to the determining that the search query causes the second plurality of search results to be presented, causing an indication of the determination to the human annotator to be presented along with a request to modify the search query;

receiving additional search queries from the human annotator and determining whether each of the additional search queries would cause one or more search results to be presented; and determining whether the content rating score should be adjusted in response to the search query, the additional search queries, and the one or more search results responsive to the search query and the additional search queries.

\* \* \* \* \*